(12) United States Patent
Skogg et al.

(10) Patent No.: US 8,194,914 B1
(45) Date of Patent: Jun. 5, 2012

(54) ENCODING AND DECODING DATA INTO AN IMAGE USING IDENTIFIABLE MARKS AND ENCODED ELEMENTS

(75) Inventors: Nicole S. Skogg, Aurora, CO (US); David M. Crookham, Valencia, CA (US)

(73) Assignee: Spyder Lynk, LLC, Denver, CO (US)

( * ) Notice: Subject to any disclaimer, the term of this patent is extended or adjusted under 35 U.S.C. 154(b) by 1109 days.

(21) Appl. No.: 11/975,741

(22) Filed: Oct. 19, 2007

Related U.S. Application Data

(60) Provisional application No. 60/862,208, filed on Oct. 19, 2006.

(51) Int. Cl.
*G06K 9/00* (2006.01)
(52) U.S. Cl. .................................................. 382/100
(58) Field of Classification Search .................. 382/100; 235/454–473
See application file for complete search history.

(56) References Cited

U.S. PATENT DOCUMENTS

| | | | |
|---|---|---|---|
| 2,612,994 | A | 10/1952 | Woodland et al. |
| 4,204,639 | A | 5/1980 | Barber et al. |
| 4,581,482 | A | 4/1986 | Rothfjell |
| 5,128,525 | A | 7/1992 | Steams et al. |
| 5,168,147 | A | 12/1992 | Bloomberg |
| 5,369,261 | A | 11/1994 | Shamir |
| 5,395,181 | A | 3/1995 | Dezse et al. |
| 5,467,155 | A | 11/1995 | Miyazaki et al. |

(Continued)

FOREIGN PATENT DOCUMENTS

EP 1054335 A2 11/2000

(Continued)

OTHER PUBLICATIONS

Morris, J., "CueCat Resources", "Webpage at http://www.beau.lib.la.us/~jmorris/linux/cuecat/ downloaded", Sep. 7, 2005, p. 4, Published in: US.

(Continued)

*Primary Examiner* — Jingge Wu
*Assistant Examiner* — Sean Motsinger
(74) *Attorney, Agent, or Firm* — Neugeboren O'Dowd PC

(57) ABSTRACT

An encoded image and methods for encoding and decoding encoded images. In one example, an encoded image may include at least one identifiable mark (also referred to herein as an anchor image); a triggering image that indicates the presence of the encoded image; and at least one encoded element adjacent to the identifiable mark, the at least one encoded element positioned at a location relative to the identifiable mark, the location representing a value. In one embodiment, a method to form an encoded image may include the operations of selecting a value, the value having one or more digits; based on at least one or more of the digits, selecting an anchor image; selecting at least one element for positioning proximate to the anchor image; forming the image using the anchor image and the at least one element; and based on at least one or more of the digits, forming a characteristic of the at least one element. A method of decoding an encoded image may include, in one example, receiving the encoded image for decoding, the encoded image comprising a decoding trigger, an anchor image, and at least one encoded element; recognizing the decoding trigger within the encoded image; recognizing the anchor image within the encoded image; selecting a decoding process from a plurality of decoding processes based on the anchor image; and decoding the encoded image using the selected decoding process.

16 Claims, 19 Drawing Sheets

U.S. PATENT DOCUMENTS

| | | | | |
|---|---|---|---|---|
| 5,675,671 | A * | 10/1997 | Hayduchok et al. | 382/296 |
| 5,761,686 | A | 6/1998 | Bloomberg | |
| 5,841,978 | A | 11/1998 | Rhoads | |
| 5,933,829 | A | 8/1999 | Durst et al. | |
| 5,978,773 | A | 11/1999 | Hudetz et al. | |
| 6,076,738 | A | 6/2000 | Bloomberg et al. | |
| 6,108,656 | A | 8/2000 | Durst et al. | |
| 6,122,403 | A | 9/2000 | Rhoads | |
| 6,199,048 | B1 | 3/2001 | Hudetz et al. | |
| 6,314,457 | B1 | 11/2001 | Schena et al. | |
| 6,324,573 | B1 | 11/2001 | Rhoads | |
| 6,434,561 | B1 | 8/2002 | Durst, Jr. et al. | |
| 6,446,871 | B1 | 9/2002 | Buckley et al. | |
| 6,542,933 | B1 | 4/2003 | Durst, Jr. et al. | |
| 6,549,894 | B1 | 4/2003 | Simpson et al. | |
| 6,614,914 | B1 | 9/2003 | Rhoads et al. | |
| 6,647,130 | B2 * | 11/2003 | Rhoads | 382/100 |
| 6,650,761 | B1 | 11/2003 | Rodriguez et al. | |
| 6,661,904 | B1 * | 12/2003 | Sasich et al. | 382/100 |
| 6,742,708 | B2 * | 6/2004 | Shaked et al. | 235/462.01 |
| 6,813,367 | B1 | 11/2004 | Bhattacharjya | |
| 6,819,776 | B2 | 11/2004 | Chang | |
| 6,826,289 | B1 | 11/2004 | Hashimoto | |
| 6,865,608 | B2 | 3/2005 | Hunter | |
| 6,892,947 | B1 * | 5/2005 | Jam et al. | 235/462.01 |
| 6,938,017 | B2 * | 8/2005 | Yen et al. | 705/62 |
| 6,947,571 | B1 | 9/2005 | Rhoads et al. | |
| 6,965,682 | B1 | 11/2005 | Davis et al. | |
| 6,965,683 | B2 | 11/2005 | Hein, III | |
| 6,980,654 | B2 | 12/2005 | Alasia et al. | |
| 6,993,573 | B2 | 1/2006 | Hunter | |
| 7,206,433 | B2 | 4/2007 | Cordery | |
| 7,226,087 | B2 | 6/2007 | Alasia et al. | |
| 7,383,209 | B2 | 6/2008 | Hudetz et al. | |
| 7,430,588 | B2 | 9/2008 | Hunter | |
| 7,520,001 | B2 | 4/2009 | Gotoh et al. | |
| 7,680,324 | B2 * | 3/2010 | Boncyk et al. | 382/165 |
| 7,697,945 | B2 | 4/2010 | Franklin | |
| 7,751,629 | B2 * | 7/2010 | Cheong et al. | 382/232 |
| 7,765,126 | B2 | 7/2010 | Hudetz et al. | |
| 2001/0001854 | A1 | 5/2001 | Schena et al. | |
| 2001/0023457 | A1 | 9/2001 | Tack-Don et al. | |
| 2002/0020746 | A1 * | 2/2002 | Roustaei | 235/462.01 |
| 2002/0028015 | A1 | 3/2002 | Tack-don et al. | |
| 2002/0032698 | A1 | 3/2002 | Cox | |
| 2002/0037097 | A1 | 3/2002 | Hoyos et al. | |
| 2002/0062382 | A1 | 5/2002 | Rhoads et al. | |
| 2002/0067855 | A1 | 6/2002 | Chiu et al. | |
| 2002/0075298 | A1 | 6/2002 | Schena et al. | |
| 2002/0186884 | A1 * | 12/2002 | Shaked et al. | 382/183 |
| 2002/0194480 | A1 | 12/2002 | Nagao | |
| 2003/0040957 | A1 | 2/2003 | Rodriguez et al. | |
| 2004/0026510 | A1 | 2/2004 | Cheung et al. | |
| 2004/0044576 | A1 | 3/2004 | Kurihara et al. | |
| 2004/0062443 | A1 * | 4/2004 | Yen et al. | 382/209 |
| 2004/0078333 | A1 | 4/2004 | Hilton et al. | |
| 2004/0117627 | A1 | 6/2004 | Brewington | |
| 2004/0123134 | A1 * | 6/2004 | Sasich et al. | 713/200 |
| 2004/0125413 | A1 * | 7/2004 | Cordery | 358/3.28 |
| 2004/0249709 | A1 | 12/2004 | Donovan et al. | |
| 2004/0258274 | A1 * | 12/2004 | Brundage et al. | 382/100 |
| 2005/0084158 | A1 | 4/2005 | Yano | |
| 2005/0109846 | A1 * | 5/2005 | Lubow | 235/462.01 |
| 2005/0179956 | A1 * | 8/2005 | Silverbrooks et al. | 358/3.28 |
| 2006/0097062 | A1 * | 5/2006 | Cheong et al. | 235/494 |
| 2006/0098241 | A1 * | 5/2006 | Cheong et al. | 358/463 |
| 2006/0255163 | A1 | 11/2006 | Bian | |
| 2006/0267753 | A1 | 11/2006 | Hussey et al. | |
| 2007/0088953 | A1 | 4/2007 | Hilton et al. | |
| 2007/0119944 | A1 * | 5/2007 | Cai | 235/462.25 |
| 2008/0002853 | A1 | 1/2008 | Kawabe et al. | |
| 2008/0233984 | A1 | 9/2008 | Franklin | |
| 2009/0221312 | A1 | 9/2009 | Franklin | |
| 2009/0255992 | A1 * | 10/2009 | Shen | 235/462.1 |

FOREIGN PATENT DOCUMENTS

| | | | |
|---|---|---|---|
| JP | 2001273441 A1 | 10/2001 | |
| JP | 2002163532 A | 6/2002 | |
| JP | 2003044414 A | 2/2003 | |
| JP | 2003150437 A | 5/2003 | |
| JP | 2005286844 A | 10/2005 | |

OTHER PUBLICATIONS

Heusler, N., "Communication from EPO related to Application No. 07 762 657.0-2210", Jun. 6, 2011, p. 4, Published in: EP.

Belia, Matthew, "Written Opinion of the International Searching Authority re Application PCT/US07/02451", Sep. 24, 2008, p. 4, Published in: PCT.

Heusler, N., "International Search Report re Application No. PCT/US07/002451", Oct. 26, 2010, p. 7, Published in: EP.

"Pumps & Boots Trend Book", 2006.

Montsinger, Sean T., "Office Action in U.S. Appl. No. 11/627,967", Jan. 21, 2009, p. 7, Published in: US.

Pinto, James A., "Amendment and Response to Office Action", Jul. 21, 2009, p. 8, Published in: US.

Montsinger, Sean T., "Office Action in U.S. Appl. No. 11/627,967", Nov. 6, 2009, p. 8, Published in: US.

Pinto, James A., "Amendment and Response to Office Action", May 6, 2010, p. 8, Published in: US.

Motsinger, Sean T., "Office Action in U.S. Appl. No. 11/627,967", Dec. 22, 2010, p. 5, Published in: US.

Pinto, James A., "Amendment and Response to Office Action", Jun. 22, 2011, p. 7, Published in: US.

Motsinger, Sean T., Interview Summary in U.S. Appl. No. 11/627,967, p. 3, Published in: US.

Neugeboren, Craig A., "Request for Continued Examination", Oct. 7, 2011, p. 7, Published in: US.

* cited by examiner

Operation 1: Obtain alphanumeric number or data to be encoded

Operation 2: Convert obtained alphanumeric number to a standardized composite number including one or more numeric blocks

Operation 3: Determine anchor and encoding processes to be used from first numeric block

Operation 4: Use encoding process and remaining numeric blocks to determine remaining visual coding block

Figure 2

Number Conversion Database

| Raw number | Composite Number | | | | | | | |
|---|---|---|---|---|---|---|---|---|
| | Block A | Block B | Block C | Block D | Block E | Block F | Block G | Block H |
| 83629210 | 88888 | 1173 | 220 | 120 | 035 | 2 | 2 | 4 |
| 83629211 | 88888 | 1173 | 220 | 120 | 035 | 2 | 3 | 2 |
| 83629212 | 88888 | 1173 | 220 | 120 | 035 | 3 | 3 | 3 |
| 83629213 | 88888 | 1173 | 220 | 120 | 035 | 2 | 3 | 4 |
| 83629214 | 88888 | 1173 | 220 | 120 | 035 | 2 | 4 | 2 |
| 83629215 | 88888 | 1173 | 220 | 120 | 035 | 2 | 4 | 3 |
| 83629216 | 88888 | 1173 | 220 | 120 | 035 | 2 | 4 | 4 |

Figure 3

*Block B: Button Locations*

Polar Locations

| Block B | Button 1 | Button 2 | Button 3 |
|---|---|---|---|
| 1170 | 25 | 90 | 190 |
| 1171 | 25 | 90 | 205 |
| 1172 | 25 | 90 | 220 |
| 1173 | 25 | 90 | 235 |
| 1174 | 25 | 90 | 250 |
| 1175 | 25 | 90 | 265 |
| 1176 | 25 | 90 | 280 |

Figure 6

Operation 1: Image analysis software recognizes the specific anchor(s) used in visual coding block

Operation 2: Numeric value associated with anchor(s) from operation 1 used to determine decoding instructions

Operation 3: Using decoding instructions, encoded elements are found to determine remaining blocks of composite number

Operation 4: Composite number is converted to original format

ENCODING AND DECODING DATA INTO AN IMAGE USING IDENTIFIABLE MARKS AND ENCODED ELEMENTS

CROSS REFERENCE TO RELATED APPLICATION

This application claims the benefit under 35 U.S.C. 119(e) to U.S. provisional application No. 60/862,208 entitled "METHOD OF ENCODING AND DECODING DATA INTO AN IMAGE USING IDENTIFIABLE MARKS AND ENCODED ELEMENTS" filed Oct. 19, 2006, the disclosure of which is hereby incorporated by reference in its entirety.

FIELD

This invention relates to encoding data into images and decoding data from images.

BACKGROUND

One and two dimensional bar codes have been developed as machine readable representations of information primarily for use in packaging, price tags and inventory control. However, the components of the bar code elements, either in part or in whole, restrict the creative graphical design of the bar code. For example, two dimensional bar codes generally store information along the height as well as the length of a symbol as a series of black and white squares within a grid. Accordingly, variation within the grid is typically limited to rearrangement of the black and white squares.

As recognized by the present inventors, what is needed is a graphically based image that can serve as a link from physical material or visual displays to electronic data.

SUMMARY

According to one broad aspect of one embodiment of the present invention, disclosed herein is an encoded image comprising at least one identifiable mark (also referred to herein as an anchor image); a triggering image that indicates the presence of the encoded image; and at least one encoded element adjacent to the identifiable mark, the at least one encoded element positioned at a location relative to the identifiable mark, the location representing a value. The encoded image can be formed and printed as advertisements, in print media, or otherwise displayed to an end-user. The encoded image can be associated with information that is desired to be delivered to the end-user when the end-user captures the encoded image and transmits the encoded image to a server or web site that handles the encoded images. In this manner, for instance a product retailer using an encoded image in advertisements can communicate information to the end-user.

In one example, the at least one identifiable mark may be a company logo, a graphical symbol or other image. The triggering image may be positioned around the identifiable mark or otherwise located proximate the identifiable mark. In another example, the at least one encoded element includes one or more graphical symbols positioned along a first circle positioned about the at least one identifiable mark, and the at least one encoded element includes one or more graphical symbols positioned along a second circle positioned about the at least one identifiable mark, the second circle concentric to the first circle.

According to another broad aspect of one embodiment of the present invention, disclosed herein is a method of forming an image. In one embodiment, the method may include the operations of selecting a value, the value having one or more digits; based on at least one or more of the digits, selecting an anchor image; selecting at least one element for positioning proximate to the anchor image; forming the image using the anchor image and the at least one element; and based on at least one or more of the digits, forming a characteristic of the at least one element.

In one example, at least one of the digits corresponds to an angular location of the at least one element relative to the anchor image. In another example, the operation of forming a characteristic of the at least one element may include positioning the at least one element relative to the anchor image at a location that corresponds to at least one or more of the digits. In another example, the operation of forming a characteristic of the at least one element may include coloring the at least one element with color that corresponds to at least one of the digits. In another example, the operation of forming a characteristic of the at least one element may include sizing the at least one element with a size that corresponds to at least one of the digits. In another example, the operation of forming a characteristic of the at least one element may include orienting the at least one element, relative to the anchor image, at an orientation that corresponds to at least one of the digits.

According to another broad aspect of one embodiment of the present invention, disclosed herein is a method of encoding a value into an image. In one embodiment, the method may include forming one or more blocks of digits, each of the one or more block of digits representing a portion of the value; selecting a primary image based on the content of at least one of the blocks of digits; selecting at least one secondary image; constructing the image using the primary image and the secondary image; and positioning the at least one secondary image in a location relative to the primary image based on the content of at least one of the blocks of digits.

In one example, the operation of selecting a secondary image may be based on the content of at least one of the blocks of digits. The primary image may be a logo, a graphical symbol or other image. In another example, the primary image may be associated with an encoding technique, and the operation of positioning the secondary image may be based on the encoding technique associated with the primary image.

The method may also include mapping each of the one or more blocks of digits to hierarchical content, a first of the one or more blocks of digits may be mapped to a first portion of the hierarchical content; and wherein a second of the one or more blocks of digits may be mapped to a second portion of the hierarchical content. In this way, if not all of the image can be decoded due to poor image quality, the end user may still be able to receive some relevant information.

According to another broad aspect of one embodiment of the present invention, disclosed herein is a method of decoding an encoded image having encoded data. In one example, the method may include receiving the encoded image for decoding, the encoded image comprising a decoding trigger, an anchor image, and at least one encoded element; recognizing the decoding trigger within the encoded image; recognizing the anchor image within the encoded image; selecting a decoding process from a plurality of decoding processes based on the anchor image; locating at least one encoded element; and decoding the encoded image using the selected decoding process.

In one example, the decoding operation may include examining the location of the at least one encoded element relative to the anchor image, and generating a value based on the location. The decoding operation may also include determining a size of the at least one encoded element and generating a value based on the size. The decoding operation may also include determining an orientation of the at least one encoded element, and generating a value based on the orientation. The decoding operation may also include determining a color of the at least one encoded element, and generating a value based on the color. The decoding operation may also include determining a confidence value, the confidence value representing a likelihood that the operation of recognizing the anchor image was successful.

Based on the data decoded from the image, information can be retrieved and sent to the end-user (i.e., cell phone or other device), or the end-user's device can be directed to certain web-sites or servers associated with the encoded image.

The features, utilities and advantages of the various embodiments of the invention will be apparent from the following more particular description of embodiments of the invention as illustrated in the accompanying drawings.

BRIEF DESCRIPTION OF THE FIGURES

FIG. 2 illustrates a flowchart of example operations for encoding data to form an encoded image, according to one embodiment of the present invention.

FIG. 3 illustrates an example of a data table, such as from a database, to associate a raw number with a composite number for encoding into an image, according to one embodiment of the present invention.

FIG. 6 illustrates an example of another data table, for example from a database, to associate locations of buttons with a portion of an encoded value, according to one embodiment of the present invention.

FIG. 9 illustrates a flowchart of example operations for decoding data from an encoded image, according to one embodiment of the present invention.

DETAILED DESCRIPTION

Figure 1:
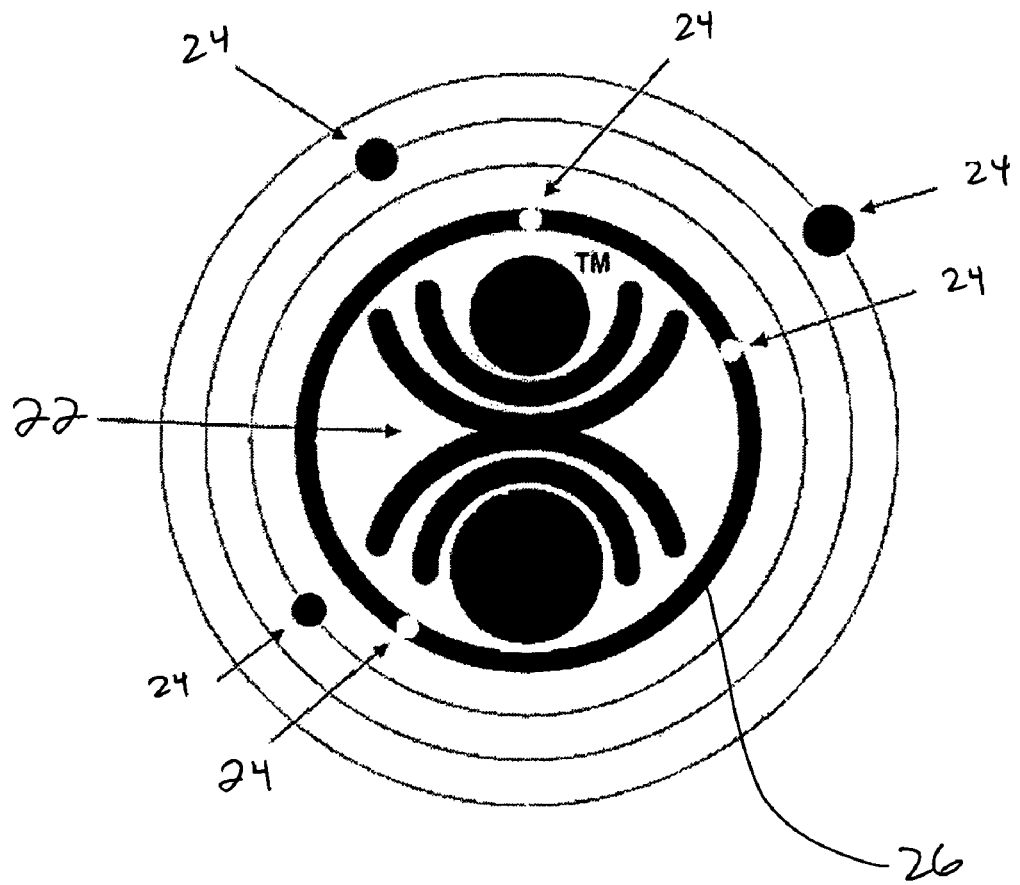
FIG. 1 illustrates an example of an encoded image according to one embodiment of the invention.

Disclosed herein are various embodiments of methods for encoding data into an image 20 such as a graphical image, as well as methods for decoding an encoded graphical image 20 to extract data therefrom. Various embodiments of encoded images are also disclosed.

An encoded image 20 can be formed and displayed on a computing device, printed with advertisements, promotional material or in other print media, or otherwise displayed to an end-user. The encoded image 20 can be associated with information that is desired to be delivered to the end-user when the end-user captures the encoded image and transmits the encoded image to a server or web site that handles the encoded images. In this manner, for instance a product retailer using an encoded image in advertisements can communicate information to the end-user.

Encoded Images

According to some embodiments of the present invention, an encoded image 20 may be formed utilizing an identifiable mark 20 (also referred to herein as an anchor image or primary image), and one or more encoded elements 24 (also referred to herein as secondary images) that are positioned about, around or within the anchor/identifiable mark 22. The identifiable marks/anchors 22 can take various forms, and the encoded elements can take various forms and can be hierarchically arranged.

Based on the characteristics of the anchor image/identifiable mark 22 and the encoded elements 24 (for example, type, size, orientations, position), unique data can be encoded in the encoded image. There are numerous uses for such encoded images, as will be described herein.

An encoded image 20 may also be formed of an anchor image 22, one or more encoded elements 24 positioned relative to the anchor image, and a decoding trigger image or trigger element 26. A triggering image 26 may take the form of any geometric shape, line, set of lines, or other predetermined visual element that indicates the presence of the encoded image, such as to a decoding process or image analysis process that the encoded image is a candidate for decoding. A decoding trigger 26 may be positioned proximate the anchor image 22, bordering the anchor image, adjacent to or apart from the anchor image. The inclusion of a decoding trigger image 26 into an encoded image 20 is optional, as a decoding process could be utilized which initiates decoding based on the presence or absence of an anchor image. One benefit of using a decoding trigger 26 in an encoded image 20 is that during initial examination of an image during decoding, a decoding process can quickly search for and recognize the triggering image 26 to determine that the image being examined is an encoded image, without the need for the decoding process to identify the anchor image or encoded elements.

In one example, the decoding trigger image 26 may take the form of a graphical shape such as a ring, circle, rectangle, square or other graphical shape and may be any part thereof.

Encoded elements 24 can be used to represent one or more numeric values based on its size, shape, orientation, location or any other digitally distinguishable feature. In one example, one or more encoded elements 24 may further function as a decoding trigger. In this way, the encoded elements can function to encode a value as well as trigger a decoding process. In another embodiment, the anchor image 22 may further function as a decoding trigger for a decoding process.

In one example, a system of polar coordinates or other coordinate systems may be associated with the encoded image 20 and may further be used to encode or decode data in the encoded image. As described herein, a graphical image can be encoded to form an encoded image 20 that contains a unique value, such as a numeric value, so that plurality of unique encoded images can be formed, each encoded with a different and unique value. In this way, a unique encoded image may be associated with—for example, a particular advertisement, web site, marketing program, corporate promotion, product promotion, sweepstakes, etc.—and when the encoded image is decoded, the unique data or value is extracted from the encoded image and can be processed for whatever purpose the encoded image is being used. In this manner, encoded images can be formed that have a similar overall appearance although each encoded image may actually contain unique encoded data.

An anchor image/identifiable mark 22 may be characterized as one or more static visual elements—such as but not limited to symbols, emblems, geometric shapes, images, letters, the initials of a person or company, numbers, astrological signs, logos, marks or any uniquely recognizable symbol or image—for instance that may be recognizable by digital image analysis processes and devices, and perceptible by humans. As such, anchors/identifiable marks 22 may provide categorical division between different brands, product types, etc. The anchor/identifiable mark can indicate the presence of an encoded image to an end user.

An encoded element 24 of an encoded image 20 can be a variable visual feature of the encoded image that can represent one or more numeric values based on its size, shape, orientation, location or any other digitally distinguishable feature. These features of an encoded element 24 can be measured absolutely, or can be measured relative to an anchor/identifiable mark or any other encoded element or distance. Encoded elements 24 can be identifiable by digital image analysis processes and may or may not be identifiable by the human visual system.

Encoded elements 24 can take on numerous shapes or forms. Their variations in patterns or placement from other encoded elements and anchors create numerous permutations available to each anchor image. Stated differently, encoded elements 24 used with a single anchor/identifiable mark can create numerous unique encoded images if each encoded element is encoded with a unique value.

Different encoded images may use different combinations and variations of anchors and/or encoded elements.

In the example of a FIG. 1, the encoded image 20 includes an anchor image 22, a first ring 26 positioned about the anchor image 22, wherein the first ring has a thickness, and a plurality of concentric rings positioned about the first ring, the plurality of rings each having a thickness less than the thickness of the first ring.

In this example, one or more encoded elements 24 are positioned along the first ring 26, and one or more encoded elements may be positioned along each of the other concentric rings.

The decoding trigger, in this example, may be defined as the first ring 26, the anchor 22, the presence of concentric rings, or any combination thereof depending upon the particular implementation. Stated differently, during a decoding process, the process can include an operation of examining the image in search of a particular triggering image, which indicates that the image is a candidate for decoding data therefrom. The decoding trigger image may be defined a priori so that encoded images include certain decoding trigger images that subsequent decoding processes will seek out during examination of an encoded image.

In this example of FIG. 1, the size, shape, color, and position of the encoded elements 24 can be based on the data encoded within the encoded image. For instance, it can be seen that the first ring includes three encoded elements 24 that are positioned at different polar locations relative to an origin defined by the anchor image 22 (FIG. 5), and the locations of these three encoded elements 24 positioned along the first ring 26 correspond to a portion of the encoded data value. The second ring is positioned outside of the first ring and is thinner than the first ring, wherein the second ring has one encoded element (i.e., the fourth encoded element) positioned along the second ring, the fourth encoded element having a size. The third ring, which is positioned outside of the second ring, has a fifth encoded element positioned therein, the fifth encoded element having a size larger than the fourth encoded element. A fourth ring is positioned outside of the third ring, the fourth ring has a sixth encoded element which has a size which is larger than the fifth encoded element, in this example.

As described below, the encoding of data may be progressive or hierarchical, if desired. For instance and by way of example only, with reference to the example of FIG. 1, the type of anchor 22 may be associated with the most significant bits or digits of encoded data; followed by the position of the first, second and third encoded elements 24 along the first ring being associated with the next series of bits or digits of encoded data; followed by the position and size of the fourth encoded element 24 along the second ring being associated with the next series of bits or digits of encoded data; followed by the position and size of the fifth encoded element 24 along the third ring being associated with the next series of bits or digits of encoded data; followed by the position and size of the sixth encoded element 24 along the fourth ring being associated with the least significant series of bits or digits of encoded data. In this manner, if during decoding, not all of the encoded image is decodable due to poor image quality, then a decoding process can still extract meaningful data from the encoded image—for instance, when the decoding process can decipher the anchor image and/or the decoding trigger, but is unable to decode all of the encoded elements.

It will be understood that various different types of anchor images 22 and decoding triggers 26 can be used to formulate a variety of different encoded images. If desired, a variety of different encoding/decoding processes can be utilized, so long as the appropriate decoding process is utilized when decoding an encoded image. In one example, the anchor image 22 and/or the decoding trigger or both can be associated with a particular decoding process. For example in FIG. 1, the anchor image 22 (or the triggering image, or both) can be associated with a polar coordinate decoding technique, so that when a decoding process receives the encoded image, the decoding process extracts the anchor image, looks up the decoding technique associated with this anchor image, and then performs decoding of the image of based upon the decoding technique associated with the anchor image.

While in FIG. 1 both the first ring and the trigger image are labeled 26, it is understood that a trigger image can take various shapes or configurations.

Figure 12:
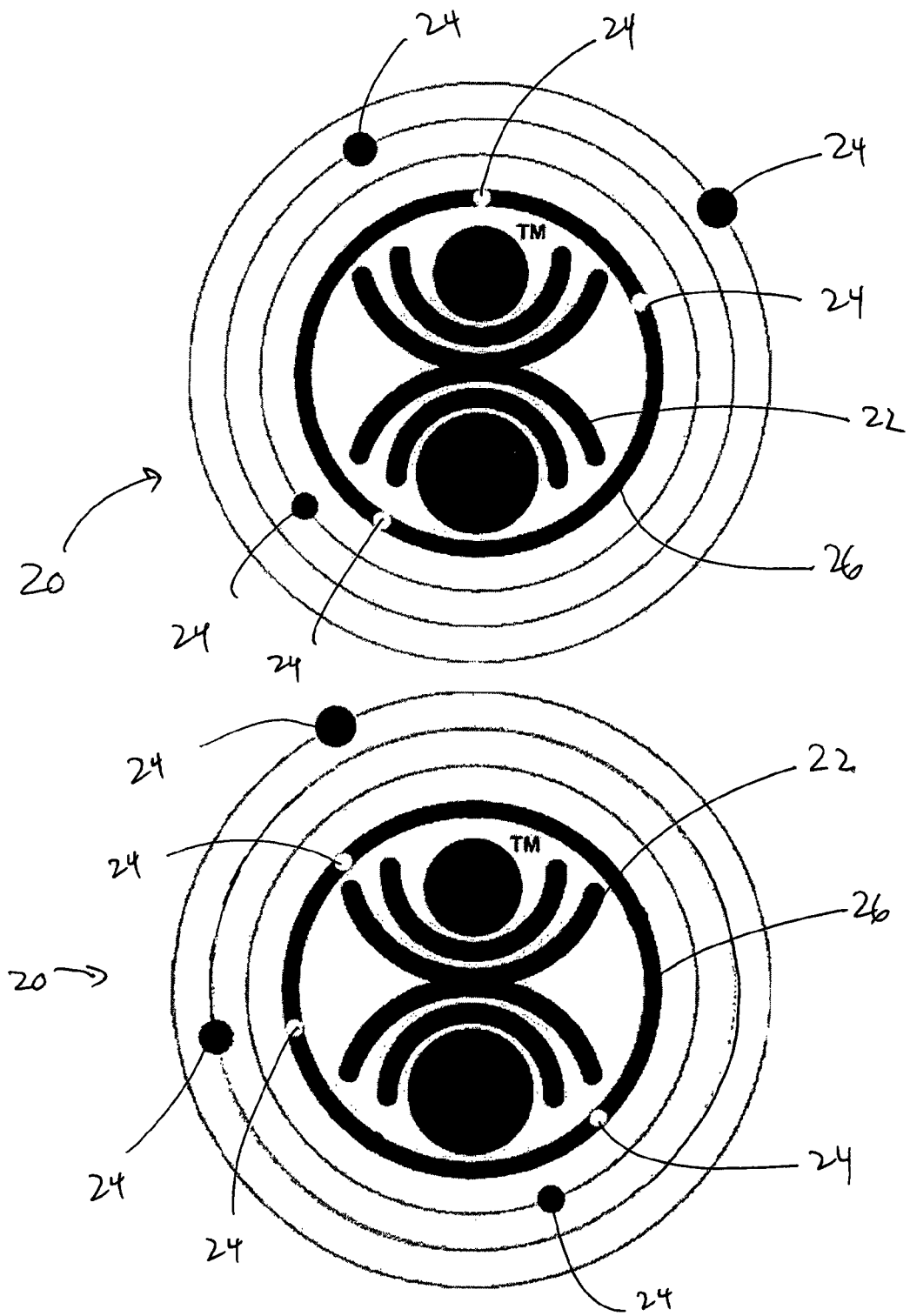
FIG. 12 illustrates examples of two encoded images that have a similar appearance but are encoded with different values, according to one embodiment of the present invention.
Figure 13:
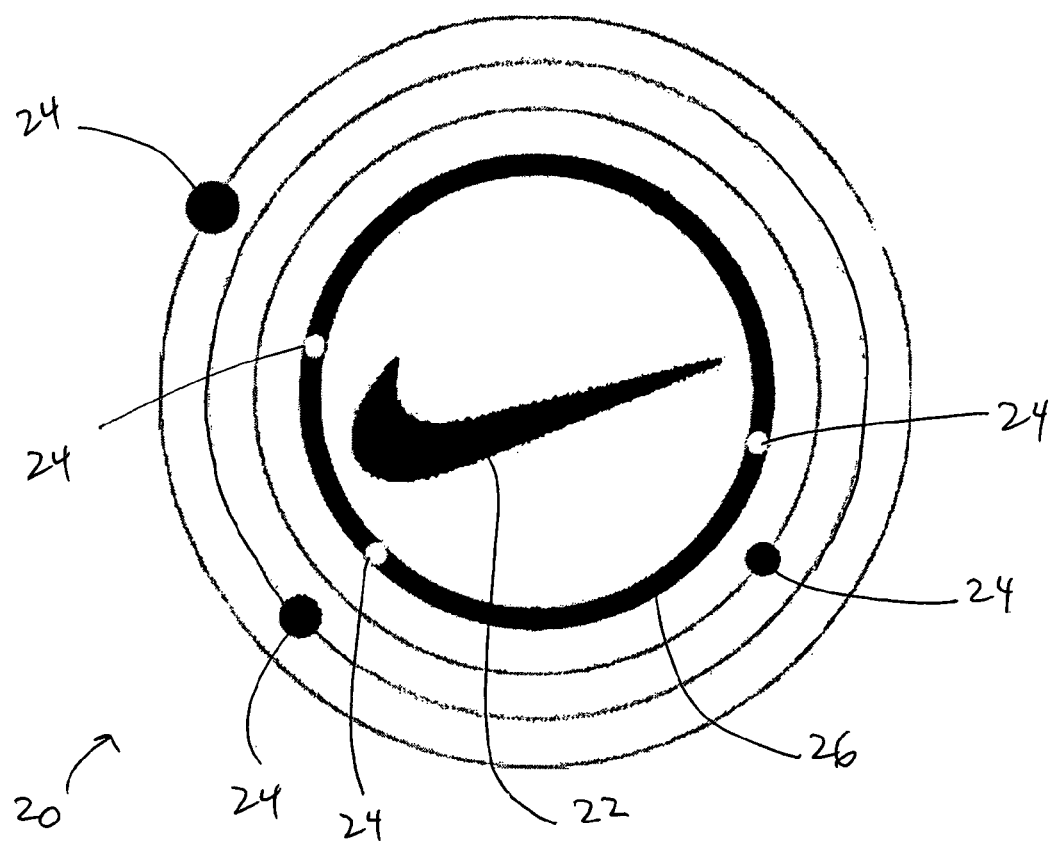
FIG. 13 illustrates another example of an encoded image according to one embodiment of the invention.
Figure 14:
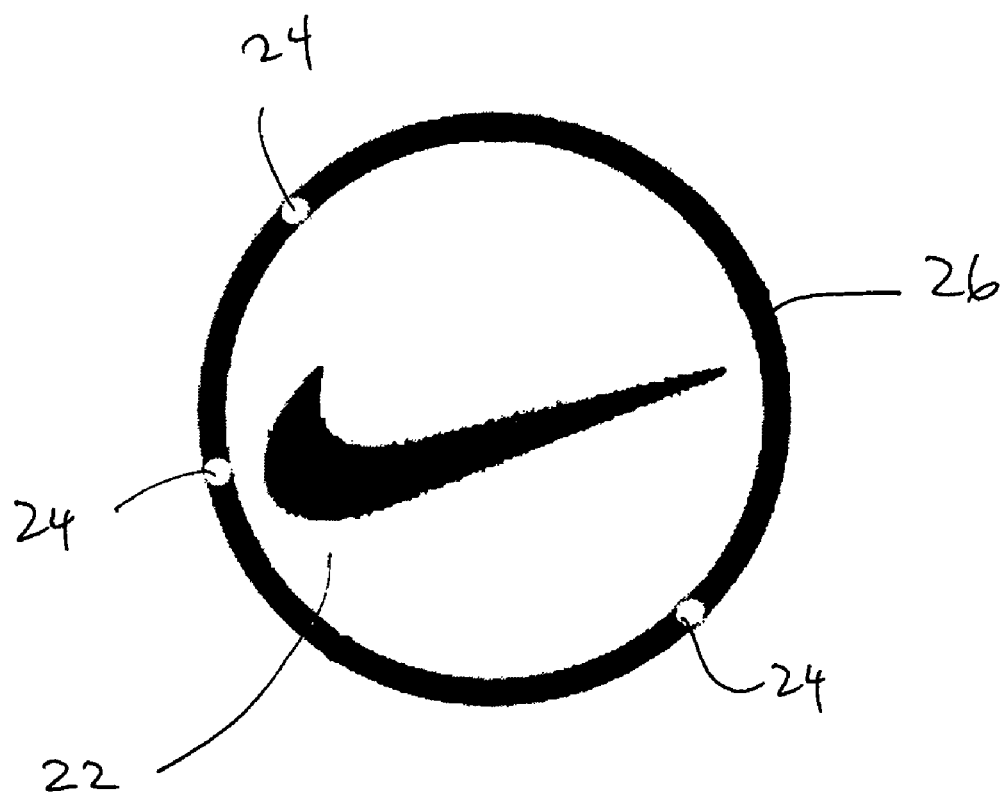
FIG. 14 illustrates another example of an encoded image having two encoded elements positioned about an anchor image, according to one embodiment of the invention.
Figure 17:
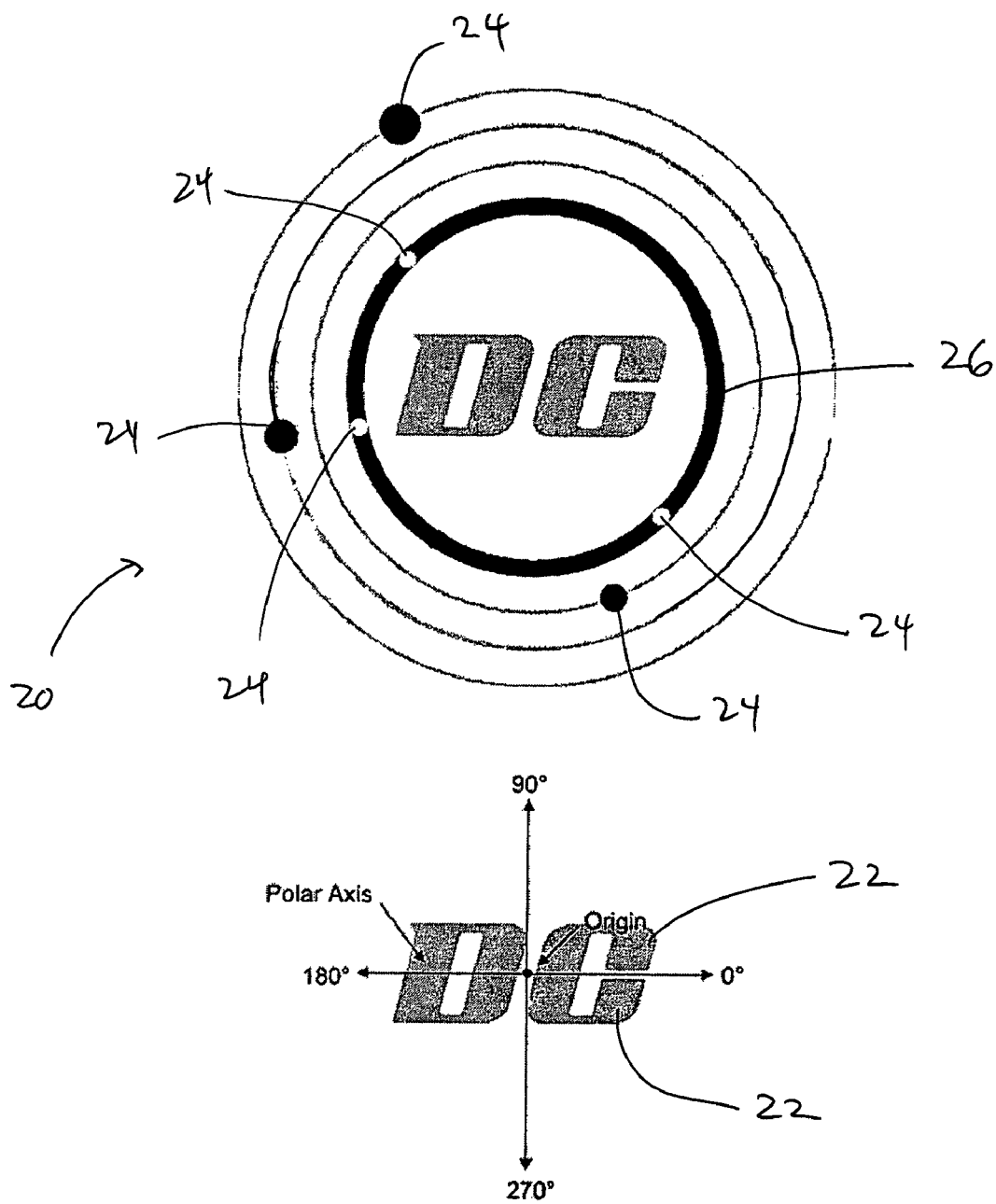
FIG. 17 illustrates another example of an encoded image, according to one embodiment of the invention.

FIG. 12 illustrates other examples of an encoded image 20, where the encoded elements 24 are positioned at various locations corresponding to different encoded data values. FIGS. 13, 14, 17 illustrate other examples of encoded images 20, wherein the anchor image 22 may include a registered trademark, a company logo, a person's initials or other letters, all by way of example only. Generally, the anchor image 22 may include any image or symbol.

Figure 5:
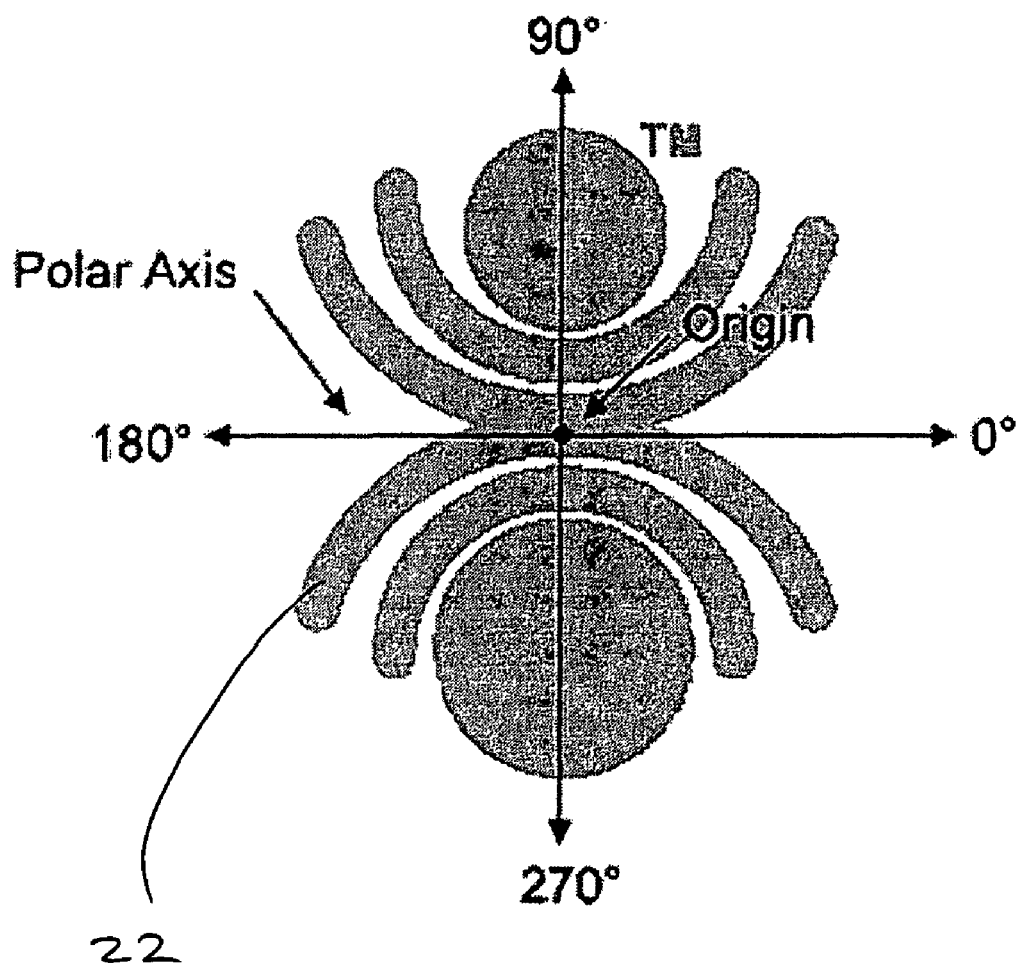
FIG. 5 illustrates an example of reference coordinates of associated with the anchor image of FIG. 4, according to one embodiment of the invention.

In the examples of FIGS. 1, 10, 12 and 15, the anchor image 22 defines a polar axis and an origin as shown in FIG. 5, which is useful for polar encoding based upon the angular locations or positions of the encoded elements relative to the polar axis of the anchor image.

Figure 18:
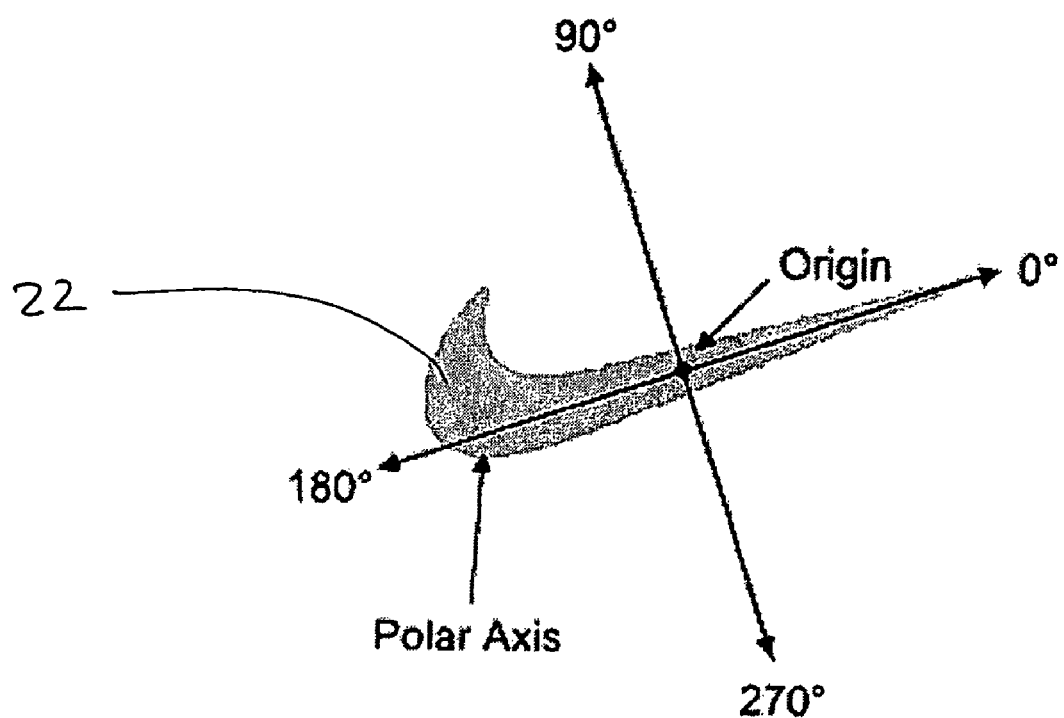
FIG. 18 illustrates another example of an anchor image, according to one embodiment of the invention.

In the example of FIG. 17, a polar axis and origin may also be defined based upon a centerline through the anchor image. Alternatively, a polar axis and origin may be defined based upon the geometry of the anchor image, such as is illustrated in the example of FIG. 18. In FIG. 18, the polar axis may be defined along the lengthwise portion of the anchor image, centered about the width of the anchor image, by way of example.

Figure 19:
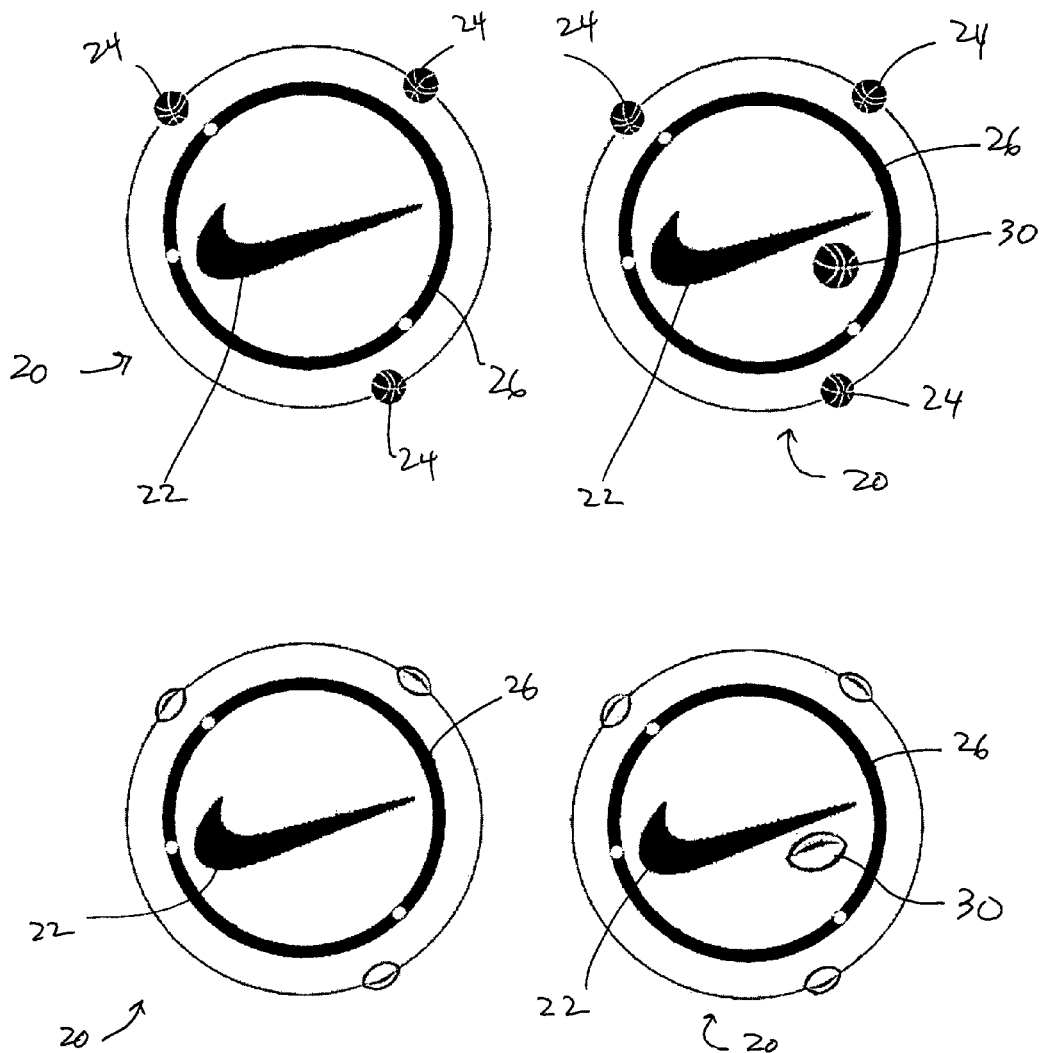
FIG. 19 illustrates other examples of encoded images, according to one embodiment of the invention.

FIG. 19 illustrates other examples of encoded images 20, in accordance with embodiments of the present invention. As shown in FIG. 19, an encoded image may include an anchor image 22 (such as a registered trademark of a company), a decoding trigger 26 (such as a ring surrounding the anchor image), encoded elements 24 within the first ring, and a second ring having encoded elements 24 therein. In this example, it can be seen that different encoded images can be formed using differing encoded elements, as FIG. 19 shows basketballs as one example of an encoded element 24, and footballs as another example of encoded elements 24. In this manner, the type and nature of encoded elements can be utilized to visually convey a theme, such as a basketball theme or a football theme, while also encoding different data.

Figure 15:
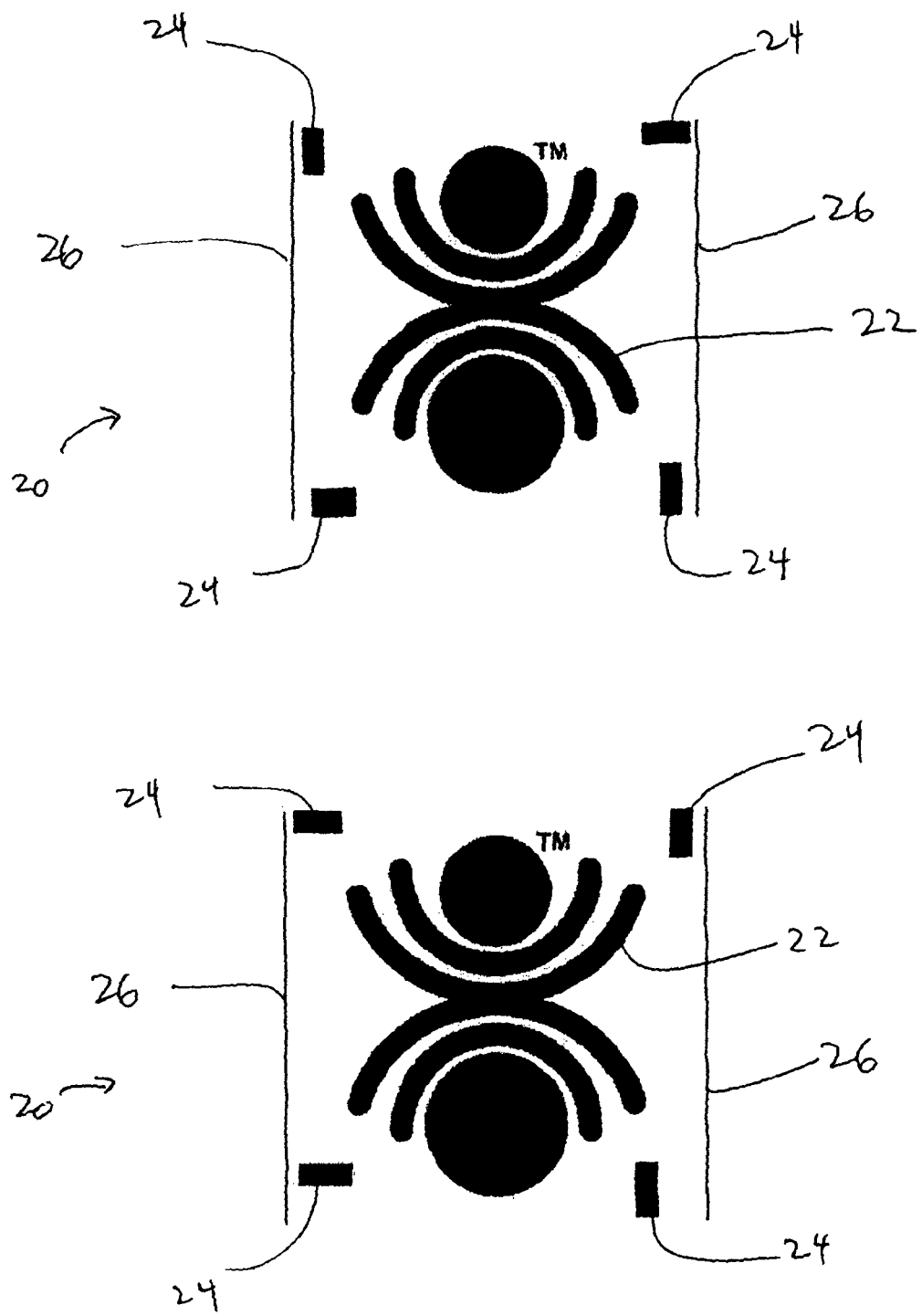
FIG. 15 illustrates another example of encoded images that have a similar appearance but are encoded with different values, according to one embodiment of the present invention.
Figure 16:
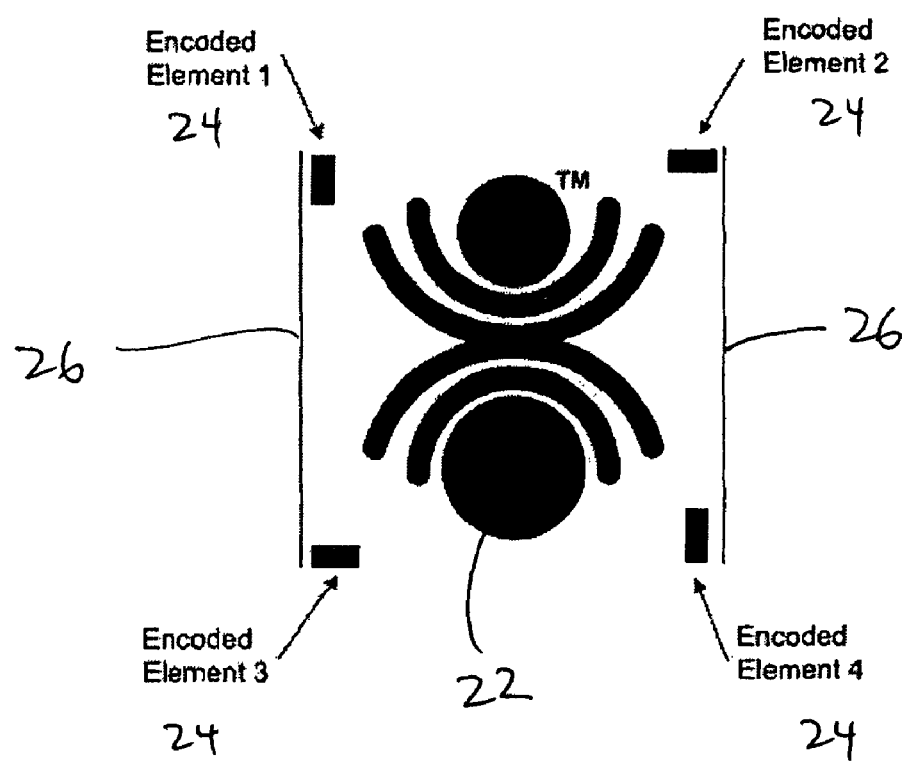
FIG. 16 illustrates another example of an encoded image, according to one embodiment of the invention.

As mentioned above, the encoded images 20 may take numerous different forms other than concentric rings (FIG. 1) about the anchor image 22. For example, FIGS. 15-16 show examples of an encoded image 20 having an anchor image 22, two parallel lines positioned about the anchor image that act as a decoding trigger image 26, and rectangular encoded elements 24 that are positioned about the anchor image. In this example, the size, color, position, shape and orientation of the encoded elements 24 can be used to encode data into the encoded image—in addition to the data that can be encoded based upon the anchor image and the decoding trigger. For example, referring to FIG. 16, encoded element one is vertically oriented, while encoded element two is horizontally oriented. Each of these orientations can be utilized to encode different values of data into the encoded image.

Numerous uses for encoded images 20 formed using embodiments of the present invention are described in co-pending patent application "Encoding and Decoding Data in an Image" filed Jan. 27, 2007, application Ser. No. 11/627,967, the disclosure of which is hereby incorporated by reference in its entirety.

Described herein are various embodiments of processes for encoding data to form an encoded image, and processes for decoding data from an encoded image.

Processes for Encoding Images with Data

Disclosed herein are various methods of forming an encoded. In one embodiment, the method may include the operations of selecting a value, the value having one or more digits; based on at least one or more of the digits, selecting an anchor image 22; selecting at least one element 24 for positioning proximate to the anchor image 22; forming the image 20 using the anchor image 22 and the at least one element 24; and based on at least one or more of the digits, forming a characteristic of the at least one element 24.

In one example, at least one of the digits corresponds to an angular location of the at least one element 24 relative to the anchor image 22. In another example, the operation of forming a characteristic of the at least one element 24 may include positioning the at least one element 24 relative to the anchor image 22 at a location that corresponds to at least one or more of the digits. In another example, the operation of forming a characteristic of the at least one element 24 may include coloring the at least one element 24 with color that corresponds to at least one of the digits. In another example, the operation of forming a characteristic of the at least one element 24 may include sizing the at least one element 24 with a size that corresponds to at least one of the digits. In another example, the operation of forming a characteristic of the at least one element 24 may include orienting the at least one element 24, relative to the anchor image 22, at an orientation that corresponds to at least one of the digits.

In one embodiment, a method for encoding a value into an image or symbol 20 may include forming one or more blocks of digits, each of the one or more block of digits representing a portion of the value; selecting a primary image (such as an anchor image 22) based on the content of at least one of the blocks of digits; selecting at least one secondary image (such as an encoded element 24); constructing the image 20 using the primary image 22 and the secondary image 24; and positioning the at least one secondary image 24 in a location relative to the primary image 22 based on the content of at least one of the blocks of digits.

In one example, the operation of selecting a secondary image 24 may be based on the content of at least one of the blocks of digits. The primary image 22 may be a logo, a graphical symbol or other image. In another example, the primary image 22 may be associated with an encoding technique, and the operation of positioning the secondary image 24 may be based on the encoding technique associated with the primary image 22. The method may also include mapping each of the one or more blocks of digits to hierarchical content, a first of the one or more blocks of digits may be mapped to a first portion of the hierarchical content; and a second of the one or more blocks of digits may be mapped to a second portion of the hierarchical content. In this way, if not all of the image 20 can be decoded due to poor image quality, the end user may still be able to receive some relevant information.

FIG. 2 illustrates an example of operations for forming an encoded image 20, in accordance with one embodiment of the present invention. At operation 1, a unique number or data value to be encoded into an encoded image is obtained. The value or number to be encoded can be a unique number or unique value so that when the image is decoded, the value extracted from the decoded image is unique. However, in many applications it may be useful to utilize a non-unique number or value when forming the image. The number or value to be encoded can be gathered from a database, and may correspond to specific content associated with a particular person, advertiser, company, entity, product, in some examples. In various embodiments, the content associated with the number or value may be dynamically modified by amending the database—for instance, changing the content of the information that will be displayed to the end user when the image is decoded.

The obtained number or value or data may be expressed in a variety of ways (such as binary, decimal, hexadecimal, alphanumeric, etc.). If necessary, at operation 2 the number can be converted to a standardized format, for instance by a reference database (for example, FIG. 3) or conversion algorithm. The conversion or assignment of each encoded number or value to a standardized composite number or value may be systematic and consistent, or it may be completely arbitrary in another embodiment. The standardized format can be determined by a specific encoding scheme if desired. In one example, a composite number may be formed from a value that is to be decoded, the composite number having one or more digits (digits can be alphanumeric having either numbers or letters) or with certain blocks of digits indicating the settings for certain encoded elements and anchors. Each digit or block of digits can be labeled and interpreted separately. FIG. 3 shows a mapping from a value (raw number) to a composite number having blocks of one or more digits.

At operation 3, one of the digits or blocks of digits, for example the first block, from the composite number can be used to determine which anchor/identifiable mark(s) will be used for the encoded image. This block is referred to herein as the "anchor block." In addition to denoting which anchor/identifiable mark to use, this anchor block may also contain information about which specific encoding processes should be used in the construction of the encoded image 20.

At operation 4, the remaining digits or blocks of the composite number can be used in conjunction with the encoding instructions obtained from the anchor block to construct or form the rest of the encoded image. Each digit or block of the composite number may provide data for one or more encoded elements 24 within the encoded image 20. Depending on the method of encoding, the data may indicate a particular scalar value, or it may be referenced to a database to indicate (for example) a specific position, size, color, orientation, or any visual characteristic for the encoded element 24 relative to the anchor/identifiable mark 22. As such, digits or blocks of the composite number may contain data representing a polar, radial, or Cartesian position for a particular encoded element; or may contain orientation information, color information, and/or inherent pattern information; a relative size or distance from an origin point in the anchor/identifiable mark or from another encoded element; or could be used to indicate a level of transparency for the element. Any digitally distinguishable feature of one or more encoded elements can be represented by the data in a digit or block.

The particular encoding technique corresponding to any particular block may be determined or specified by another block from the same composite number (for example, the anchor block).

Figure 8:
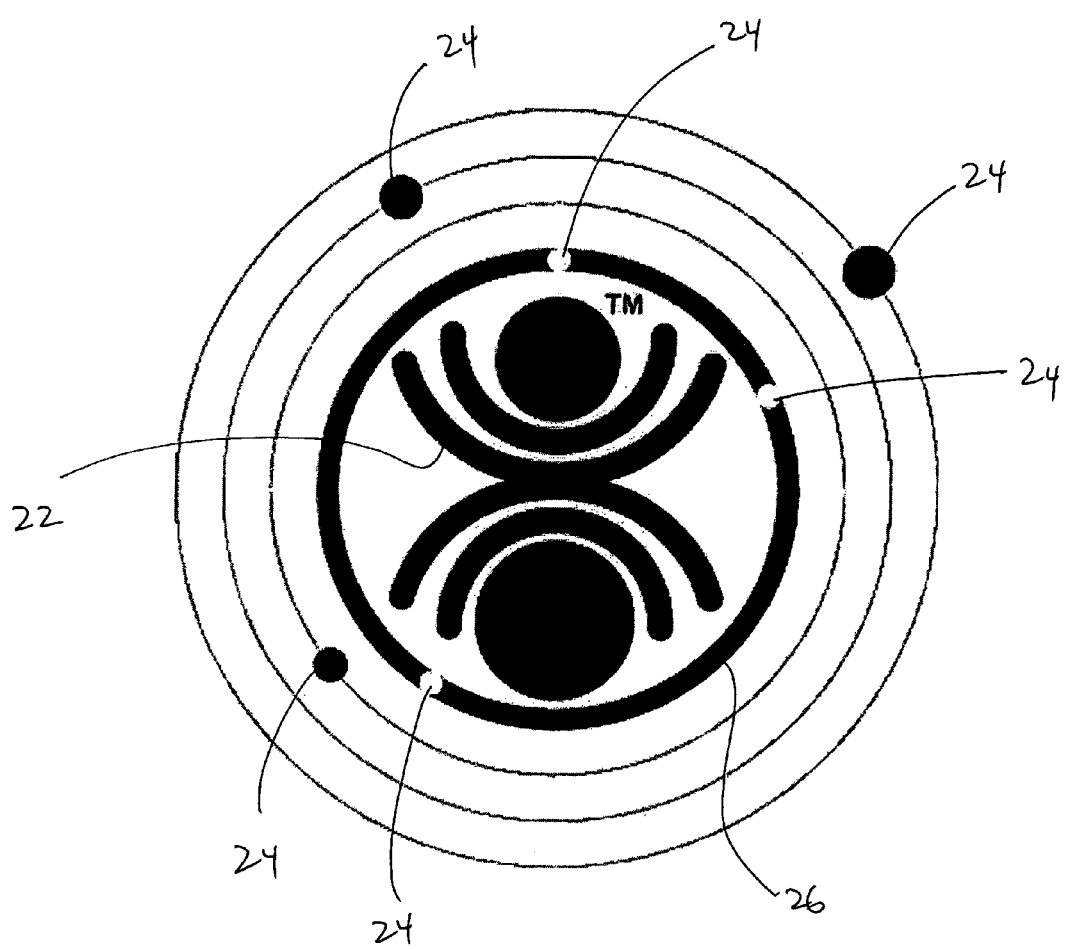
FIG. 8 illustrates an example of the anchor image of FIG. 7 with additional encoded elements positioned thereabout, according to one embodiment of the invention.

An example of an encoding process with reference to example data is now described. FIG. 8 shows an encoded image 20 formed by the process and composite number for this example.

At operation 1, the number to be encoded is obtained. In this example, the number is an eight digit number, 83629213.

At operation 2, using a database or lookup table, for example, as shown in the example of FIG. 3, it is determined that this number to be encoded corresponds to the standardized/composite number of: 88888 1173 220 120 035 2 3 4. The first block, 88888, is labeled "Block A" and is the anchor block in this example. This anchor block indicates which anchor/identifiable mark(s) will be used to form the encoded image, as well as the encoding format and process that will be used with the remaining digits or blocks of the composite number. The second block, 1173, is labeled "Block B" and gives information to encode an encoded element 24 or group of encoded elements 24. The blocks are assigned as follows:

| A: | 88888 |
|---|---|
| B: | 1173 |
| C: | 220 |
| D: | 120 |
| E: | 035 |
| F: | 2 |
| G: | 3 |
| H: | 4 |

A database or table may be provided to associate or map Block A data (anchor block) to anchor images 22 and encoding process/formats.

Figure 4:
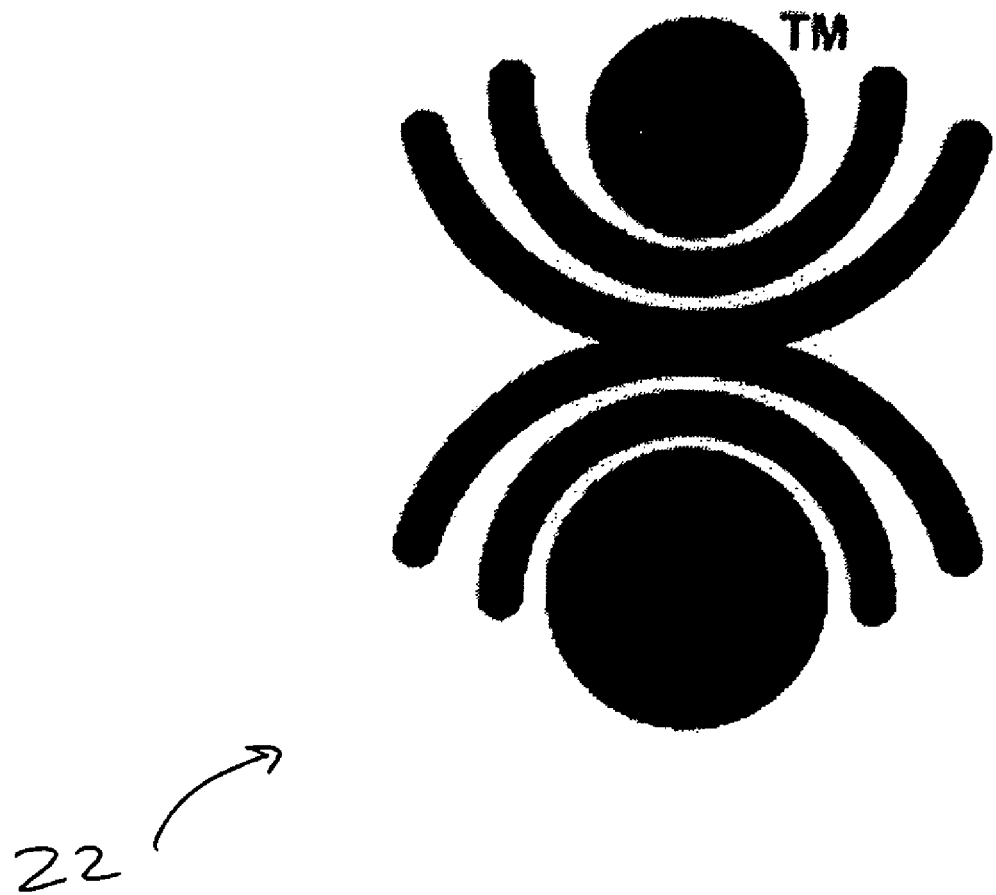
FIG. 4 illustrates an example of an anchor image, according to one embodiment of the invention.

At operation 3, referencing Block A (88888) to an anchor image database or other data structure, it is determined that Block A indicates in this example the use of the anchor/identifiable mark 22 of a spider shown in the example of FIG. 4. In this example, the anchor further includes a decoding trigger 26 of a solid circle around the anchor image 22. As mentioned above, a decoding trigger 26 can be a geometric form, shape, line, set of lines or other predetermined visual element which coveys, such as to an image analysis process, that this image is an encoded image for decoding. The trigger 26 can border the area around the anchor image 22, or can be located adjacent to or apart of the anchor itself.

For this example, assume that the following encoding instructions are obtained from the anchor database using the anchor for Block A (88888)—Coordinate System and Relative Units (Shown in FIG. 5), wherein:

Polar coordinates will be used for encoding;

Relative Units (RU) will be used to measure distances, where one relative unit is equal to the distance between the centers of the two circles in the anchor/identifiable mark. One-tenth of a radial unit is the thickness of the lines of the anchor/identifiable mark;

The origin, from which to measure the polar locations of encoded elements, is the midpoint of the line bisecting the two circles;

The polar axis, from which to measure the polar locations of encoded elements, intersects the origin and is perpendicular to the line bisecting the two circles.

Encoding Blocks B-H

Here, using this encoding process/format, the remaining data/digits/blocks of digits can be used to form the encoded image 20.

Block B, in this example, indicates the polar positions for encoded elements 1, 2, and 3. This number is referenced to another database (FIG. 6) to determine the exact polar locations. The number itself is arbitrary in this example. The radial locations of the elements are 0.9 Relative Units from the origin. The diameter of the elements is 0.1 Relative Units and they are within a circle centered at the origin that is 0.1 Relative Units thick.

Blocks C, D, and E in this example are used as indicators of the polar position of encoded elements 4, 5, and 6. The radial locations are 1.1, 1.3, and 1.5 Relative Units respectively, by way of example only, meaning that each encoded element 4, 5, 6 is positioned on a different concentric ring.

Blocks F, G, and H in this example specify the size of encoded elements 4, 5 and 6. The size of these encoded elements is one tenth of the number indicated, in one example. For example, if Block G has the number 3, then the diameter of the fifth encoded element would be 0.3 Relative Units.

At operation 4, to form the encoded image 20, the values from the composite number are used with the instructions for the encoding process or format obtained from the anchor block.

Figure 7:
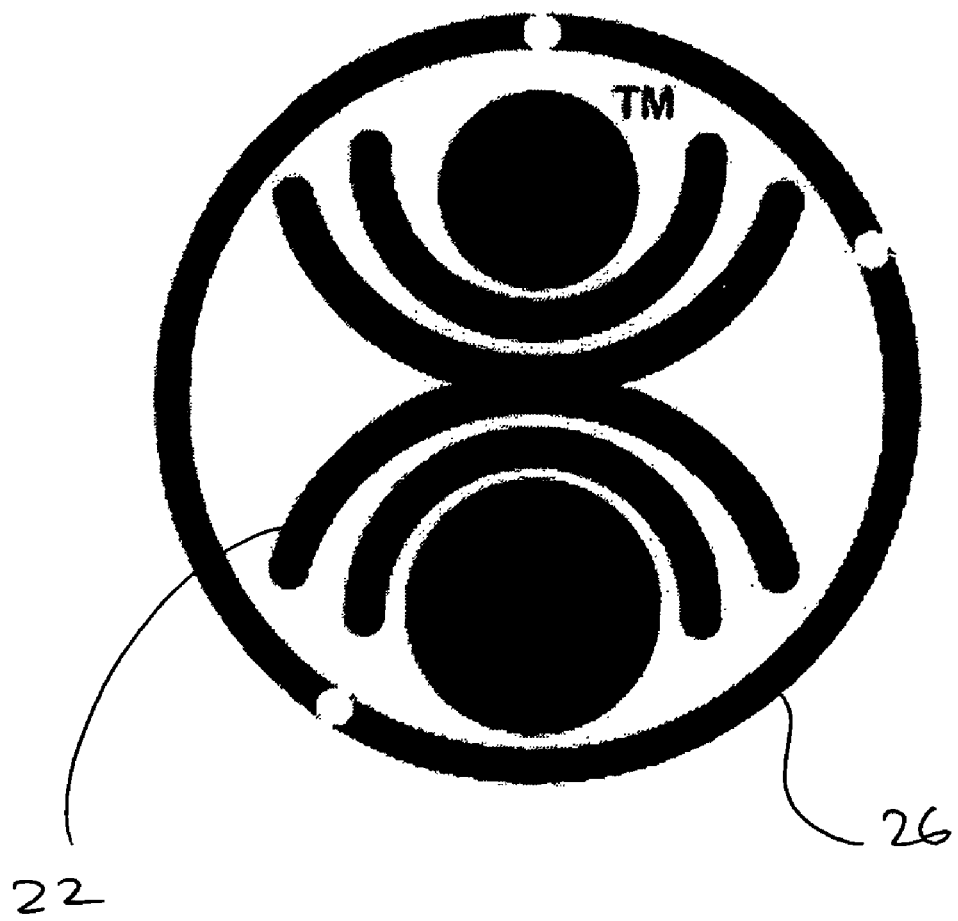
FIG. 7 illustrates an example of the anchor image of FIG. 4 with buttons positioned thereabout based on the data from FIG. 6, according to one embodiment of the invention.

Block B is 1173. This indicates, after being referenced to the Block B Database or lookup table (shown in the example of FIG. 6), that the first, second and third encoded elements (i.e., shown here in FIG. 7 as buttons 24 embedded in the circle surrounding the anchor/identifiable mark, in this example) are located at 25 degrees, 90 degrees, and 235 degrees from the polar axis. The resulting image formed using data from Blocks A and B are shown in the example of FIG. 7.

Blocks C, D, and E in this example are used as indicators of the polar position of the fourth, fifth and sixth encoded elements on orbital lines or concentric circles about the anchor/identifiable mark and outside of the trigger image, in this example. The value of Block C (220) indicates that the fourth encoded element on the first orbital line is 220 degrees from the polar axis as shown in FIG. 8. Likewise, Blocks D and E indicate that the fifth and sixth encoded elements on the second and third orbital lines are located 120 degrees and 35 degrees (respectively) from the polar axis.

As this example illustrates, in one instance (block B) the block value is referenced to a reference table to determine positions for several encoded elements 24, and in another instance (blocks C, D, and E) each block or digit represents the position or characteristic for one encoded element.

Blocks F, G, and H in this example specify the size of the encoded elements four, five, six. Block F indicates that the fourth encoded element on the first orbital line has a size of 3. Following the encoding instructions, the size of the Block F will be 0.3 "relative units" in diameter in this example. Likewise, Blocks G and H indicate that the fifth and sixth encoded elements on the second and third orbital lines are 0.3 and 0.4 Relative Units in diameter respectively in this example.

From this example it can be seen that, if desired, the composite number can be broken down into blocks. Each of the blocks can represent at least one encoded feature of at least one encoded element. Each block can represent a layer of encoding and can be decoded independent of the other blocks.

An example using only one block of digits would be where just an anchor 22 is used as the encoded image 20. For greater encoding options, an anchor 22 and encoded elements 24 could be used, such as Blocks A and B from the previous example.

Each block can be encoded with different information or mapped to different hierarchies of information. For example, a sporting goods brand or company could use the value encoded in each block to map to progressively encode more significant or detailed information into an encoded image. Block A could map to the brand name; Block B could map to the category within the brand (such as womens, mens, or childrens); Block C could represent the product such as tennis shoes; Block D could represent the exact make such as the Racer tennis shoe; Block E could map to information about the specific campaign; and Blocks F-H could map to the print media information such as publication and volume.

In one embodiment, the encoding process may be structured and prioritized according to its associated information. For example, the most easily read part of the image, typically the anchor image 22, is statistically the most easily decodable block. In the example described above, the most likely decodable block is A and the least likely decodable blocks are F-H. Because each block is independently linked to information, the encoded image 20 does not have to be completely decoded in order to provide the end-user with useful information. If certain blocks are measurable and decodable, then those pieces of information can be used. Thus, if a cell phone camera picture is taken of an encoded image and is blurry or out of focus but the anchor can be detected, but nothing else, at least the brand can be distinguished and some relevant high-level information can be sent to the end-user. Likewise, if the anchor and the positions of encoded elements 1-3 can be determined, then the information associated with both the anchor and the encoded elements can be determined. In this case, for example, the brand and category can be determined and more detailed information can be sent to the end-user.

Partial decoding can be beneficial given current camera phone technology. It is rapidly improving, however, some of the camera phones on the market today may not be capable of capturing enough information to completely transmit an encoded image for decoding. Using the progressive encoding method, as long as at least a portion of an image can be decoded, incomplete, blurry or even partial images can still prove useful for decoding an image and providing information to the end-user. For example, rather than being directed right to a promotional website, a partially decoded image could be used to at least direct a user to a category website. The user can then navigate their way to the promotion or product. This gives a user the means to still get to the information desired with a lower quality camera phone. Unlike other encoding systems which offer an all or nothing decoding scenario, progressive encoding gives the opportunity for lower quality images to be partially decoded and still useful to the end-user.

There may be some variability in image decoding. To account for this variability, during the image processing, a confidence value or string may be determined, for each decoded block, representing the likelihood that it has been decoded correctly. For example, the result of processing a high quality image could be: Block A-98% Block B-96% Block C-96% Block D-95% Block E-95% Block F-92% Block G-92% Block H-91%. This means that the results of the processing are fairly reliable. A lower quality image could have the following confidence ratings: Block A-90% Block B-88% Block C-65% Block D-60% Block E-55% Block F-50% Block G-45% Block H-45%. It could be determined, in one example based on these values and based on a minimum confidence threshold, that the results of Blocks A and B are reliable, but the rest of the information is not. In this case, information decoded only in Blocks A and B could be returned, the rest of the information could be logged, but not returned.

Processes for Decoding Encoded Images

Various embodiment are disclosed herein for decoding an encoded image 20 having encoded data. In one example, a method may include receiving the encoded image 20 for decoding, the encoded image comprising a decoding trigger 26, an anchor image 22, and at least one encoded element 24; recognizing the decoding trigger 26 within the encoded image; recognizing the anchor image 22 within the encoded image; selecting a decoding process from a plurality of decoding processes based on the anchor image 22; locating at least one encoded element 24; and decoding the encoded image 20 using the selected decoding process.

In one example, the decoding operation may include examining the location of the at least one encoded element 24 relative to the anchor image 22, and generating a value based on the location. The decoding operation may also include determining a size of the at least one encoded element 24 and generating a value based on the size. The decoding operation may also include determining an orientation of the at least one encoded element 24, and generating a value based on the orientation. The decoding operation may also include determining a color of the at least one encoded element 24, and generating a value based on the color. The decoding operation may also include determining one or more confidence values, the confidence values representing a likelihood that the operations of recognizing the anchor image 22 and encoded elements 24 were successful.

Based on the data decoded, information can be retrieved and sent to the end-user (i.e., cell phone or other device), or the end-user can be directed to certain web-sites or servers associated with the encoded image.

Figure 10:
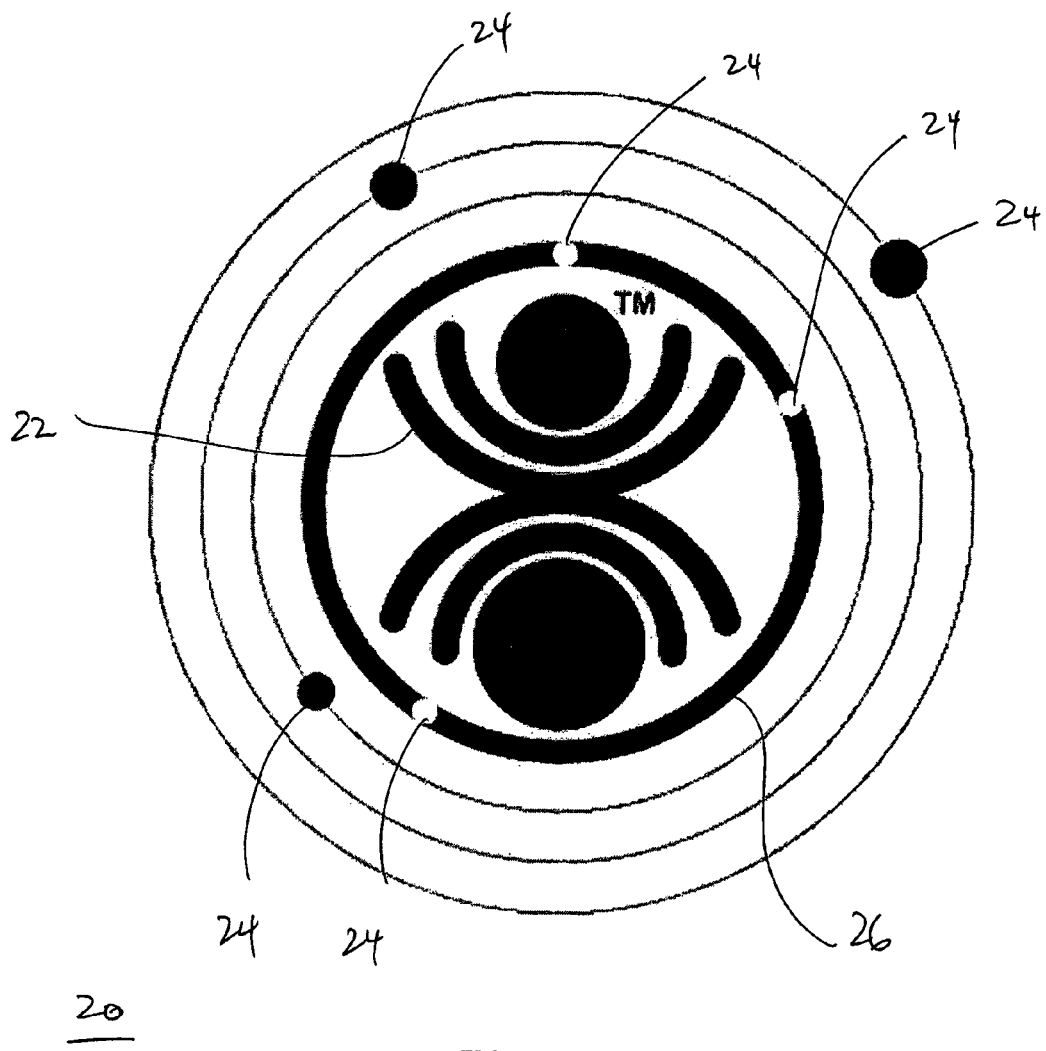
FIG. 10 illustrates an example of an encoded image according to one embodiment of the invention.

FIG. 9 illustrates an example of operations for decoding an image 20, in accordance with one embodiment of the present invention. At operation 1, the received image 20 is analyzed in order to identify or recognize the decoding trigger 26 (if used), and the specific anchor/identifiable mark(s) 22 used in the encoded image 20. The anchor/identifiable mark(s) may function to associate the encoded image with an appropriate decoding technique or process as described above. In one example, an image received for decoding activates a decoding process which attempts to locate one or more decoding triggers 26, such as one or more circles as shown in FIG. 10, so as to confirm that this image is an encoded image 20. The trigger image 26 may be separate or a part of the anchor located within the image to be decoded.

The analysis of the encoded image may find multiple potential decoding triggers 26. Each trigger 26 can be analyzed to confirm the presence of an anchor image 22. When an anchor 22 is found and recognized, the full decoding process can then continue so that the data encoded in the image can be extracted.

Stated differently, in the event that multiple decoding triggers 26 are believed to be detected during the initial examination of an image, each decoding trigger could be analyzed to confirm the presence of a full anchor 22. Upon further inspection, using object or pattern recognition, a determination could be made that there is only one full anchor match, and the decoding process could proceed based on that anchor image 22. The recognized anchor or anchors can then be referenced to a database or lookup table to determine the corresponding numeric value for the anchor/identifiable mark.

At operation 2, the numeric value associated with the recognized anchor/identifiable mark 22 obtained from operation 1 can be referenced to a database or a text file or process containing specific decoding instructions, i.e. the specific method of decoding used for that particular anchor/identifiable mark, such as the numeric interpretation of the location, relative position, and size of each encoded element 24.

At operation 3, the decoding instructions or processes from operation 2 are used to decode the encoded data in the encoded image and reconstruct the standardized composite number encoded within the image.

At operation 4, the composite number is converted to its original format by means of a database or conversion algorithm, in one example reversing operation 1 from the encoding process of FIG. 2.

It is possible for the process to return multiple possible decodes. The system can sort the possibilities by confidence values that the software provides for each possible decode. A predetermined confidence threshold or minimum can be set for all or any of the decoded blocks, to help sort through false decode values. In one example, only decoded values above that threshold will be matched to the database.

The following is an example for one of the example decoding processes described above. The example describes how the encoded image of FIG. 10 would be decoded.

Figure 11:
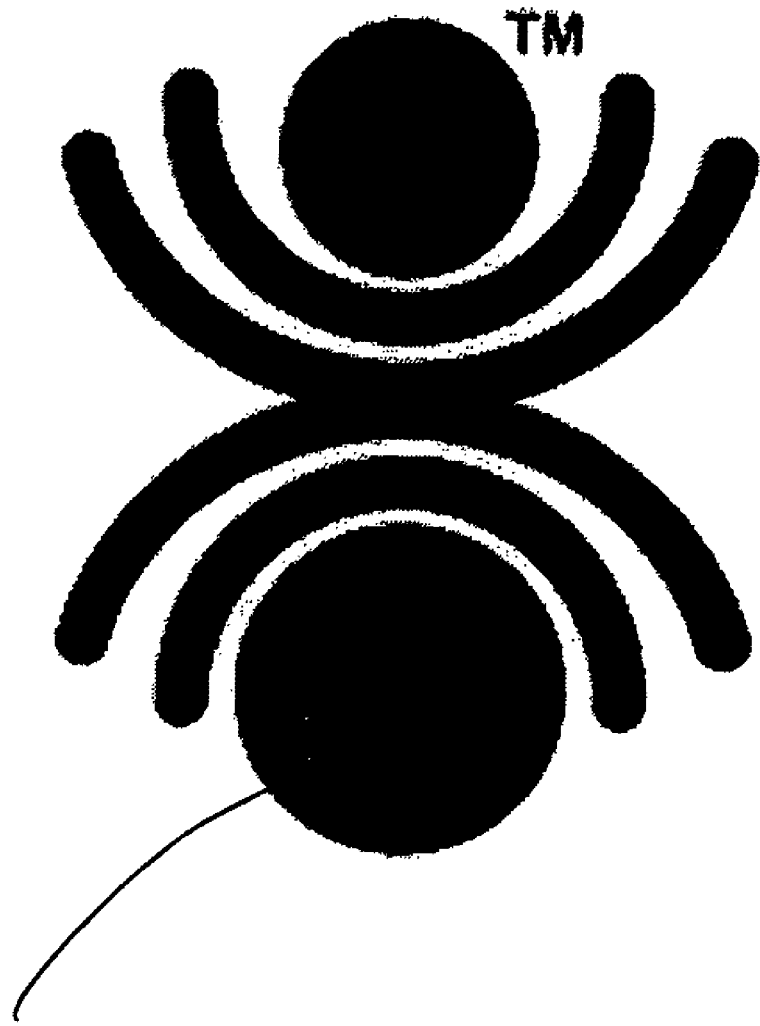
FIG. 11 illustrates an example of the anchor image of FIG. 10, according to one embodiment of the present invention.

Operation 1: The encoded image 20 of FIG. 10 is processed to recognize that the encoded image contains the anchor/identifiable mark 22 and decoding trigger 26 as shown in FIGS. 10-11. Once this anchor/identifiable mark is identified as such, it is then referenced to a database which associates the identified anchor with an anchor block number 88888, in this example.

Operation 2: The anchor block number 88888 is used to look up the decoding instructions. The instructions for this example are as follows: Composite Format, Coordinate System, and Relative Units, wherein Composite format: XXXXX XXXX XXX XXX XXX X X X Anchor Block is Block A, followed by Blocks B thru H.

Polar coordinates will be used for decoding.

Relative Units (RU) will be used to measure distances in this example. One relative unit is equal to the distance between the centers of the two circles. One-tenth of a radial unit is the thickness of the lines of the anchor/identifiable mark.

The origin is the midpoint of the line bisecting the two circles.

The polar axis intersects the origin and is perpendicular to the line bisecting the two circles.

Based on the decoding instructions obtained, the encoded image can be decoded.

Blocks B-H

Block B: Four digit number XXXX (1111 thru 3135). Find encoded elements 1, 2, and 3 at radial distance 0.9 Relative Units. Measure the polar location of each of these three elements. Use these coordinates to look up the value in the Block B Database as shown in the example of FIG. 6. The corresponding value will form Block B.

Block C: Three digit number XXX (000 thru 359) in this example. Find encoded element 4 at radial distance 1.1 Relative Units. Measure the polar location of this encoded element. This number will form Block C.

Block D: Three digit number XXX (0 thru 359) in this example. Find encoded element 5 at radial distance 1.3 Relative Units. Measure the polar location of this encoded element. This number will form Block D.

Block E: Three digit number XXX (0-359) in this example. Find encoded element 6 at radial distance 1.5 Relative Units. Measure the polar location of this encoded element. This number will form Block E.

Block F: One digit number X (2-4) in this example. Measure the diameter of encoded element 4 in Relative Units. Round to the nearest tenth. Multiply this number by 10. This number will form Block F.

Block G: One digit number X (2-4) in this example. Measure the diameter of encoded element 5 in Relative Units. Round to the nearest tenth. Multiply this number by 10. This number will form Block G.

Block H: One digit number X (2-4) in this example. Measure the diameter of encoded element 6 in Relative Units. Round to the nearest tenth. Multiply this number by 10. This number will form Block H.

Operation 3: The decoding instructions from anchor block 88888 are used and the encoded image from FIG. 10 is analyzed according to those instructions. The resulting composite number formed from the relative blocks is 88888 1173 220 120 035 2 3 4.

In one example, as part of the image decoding and analysis, a confidence value is returned that can be based on the confidence that the process has correctly matched and/or found the characteristic (i.e., position/color/size) of the encoded elements and/or anchor. This confidence value can be based for example on the object or pattern recognition confidence by returning the ratio of the number of features present in the anchor image from the database to the total number of features actually detected in the image being analyzed. In another example, a 0% confidence could be returned if only two encoded elements are found when three encoded elements where being sought based on the decoding instructions, meaning that the process has 0% confidence that it found all the encoded elements correctly.

In this example, assume the confidence level for all of the blocks has been returned as 85%. If the confidence threshold had been set at 80%, then the confidence level indicates that a successful decode has occurred.

Operation 4: The composite number 88888 1173 220 120 035 2 3 4 is referenced to a database, as shown in FIG. 3, to yield the raw number or value or the initial number encoded during the encoding process of 83629213. This is the decoded value associated with the encoded image of the example of FIG. 10.

If desired, each possible encoding may have a unique number associated with it, and not all blocks need to be distinguished. For example, Block A alone may be associated with a unique value or raw number; Blocks A and B may be associated with a unique raw number; Blocks A, B, C, D, and E may be associated with a unique value or raw number; and Blocks A, B, C, D, E, F, G, H may be associated with a unique raw number or value. The decoding instructions could have this information as part of the possible encodings, along with the thresholds for the confidence values, if desired.

Encoded images 20 constructed from the same anchors/identifiable marks and encoding processes can appear similar while the encoded values therein can be different. As an example, FIG. 12 shows two encoded images. The top example is from the example above; the second example uses the same anchor/identifiable mark 22 and encoding process, but is generated by and includes a different encoded value. The images look similar because the anchor/identifiable marks are the same, yet the encoding process allows for millions of unique and different encoded images distinguishable by the methods described herein.

FIG. 13 shows the same encoding process of the examples above; however, the anchor/identifiable mark 22 shown is a trademarked logo for Nike™, a registered trademark. This encoded image illustrates how a set of thousands or millions of unique encoded images can be generated by changing only the anchor/identifiable mark and using the same encoding process instructions.

In the example of FIG. 14, a variation of the encoding/decoding process can be used only using Blocks A and B. This process still allows for at least 2000 uniquely encoded images. FIGS. 15-16 show anchor 88888 from the example above as the anchor/identifiable mark 22, but using different encoding process instructions. This process could have 5 encoding blocks. Block A could be for the anchor/identifiable mark. Block B-E may represent the size and possibly orientation of the 4 encoded elements, which are rectangles located in the corners of the encoded image. The orientation, size or other aspect of the encoded elements can convey or represent encoded data. The possibilities for anchor/identifiable marks, encoded elements, and encoding process instructions are vast.

Encoded images 20 can take on numerous shapes and forms as the anchor/identifiable marks 22 and encoded elements 24 themselves have an unlimited number of graphical permutations. In addition, the encoding process can be varied to allow even more variations for the encoded image.

Hence, it can be seen that embodiments of the present invention can be used to encode and decode data/numeric values into graphic images.

The numeric output (i.e., the decoded value) can be used to target web addresses or other electronic mediums through a data look-up table, for example, so as to direct the end-user to a web site or to transmit information to the end-user.

In one example, the encoded image 20 can be implemented as a small mark that can create a unique identity for a print medium with minimal disruption of the advertiser's message. This is in contrast with conventional encoding methods such as such as linear and 2-D bar coding, which is not generally visually appealing and is perceived by customers as a utilitarian coding mechanism.

In one example, the encoded images 20 can be tied to unique logos or other images to support advertisers desire to stimulate sales opportunities.

In one embodiment, the encoded images 20 can be read with existing technology, such as in digital cameras, camera enabled mobile devices, or scanners, modified to have the basic decoding operations described herein, or capable of transmitting a captured image to a server or site that decodes the image. Since the decoding method can use relative measurements, tolerances can be measured and controlled based on the level of technology of the scanner or digital camera. As digital cameras and scanners technology advances and offers get to higher and higher resolutions, the number of digits or symbols that can be encoded in an image may increase. In one embodiment, an encoded image can be captured by a mobile picture taking and sending device, such as a mobile phone with a digital camera or a digital camera with a wireless capability. The encoded image can be captured, and then sent wirelessly to a server for processing. The decoding process may take place in part or in full with software included in the image taking device such as a mobile camera phone.

Groups of encoded images 20 that have a generally similar appearance can be formed and can be used as a recognizable link for a wide population (target audience).

Encoded images 20 may include a trigger image 26 such as a border surrounding the anchor/identifiable mark, in one example. The border (i.e., a circular border), in the example of FIG. 14, surrounds the anchor/identifiable mark (which is the Nike™ logo) and may be used in the detection or reading of the image by digital image recognition. The trigger image 26 serves to provide a simple graphical element as a part of the encoded image for digital image recognition software. The presence of the circle or other trigger or border element can serve to create a more efficient and reliable image detection and decoding process. The trigger image or border may have various thicknesses, colors and may include breaks or blank spaces to create additional encoding data or designs. The trigger or border 26 may take on many graphical geometric forms including but not limited to rectangles, squares, ovals, and ellipses. The trigger image or border can also be non-geometric forms, among others, and may or may not be continuous.

FIG. 17, described above, illustrates another example of an encoded image 20, in accordance with one embodiment of the present invention. One or more letters (such as a person's initials) may serve as the anchor/identifiable mark 22, and this anchor can be associated with a particular decoding process where, in this example, a polar axis is measured from an origin as shown in FIG. 17. The encoded elements 24 positioned about the anchor/identifiable mark can then be decoded to reveal the information encoded therein.

FIGS. 18-19 illustrate other examples of encoded images 20, in accordance with some embodiments of the present invention. Here, a company trademark or logo (shown in this example as the Nike "swoosh" symbol) may serve as the anchor/identifiable mark 22, and this anchor can be associated with a particular decoding process where, in this example, a polar axis is measured from an origin as shown in FIG. 18. In FIG. 19, encoded elements may be positioned about the anchor/identifiable mark in order to represent data/information encoded therein. As shown in FIG. 19, the encoded elements can themselves be different symbols—such as basketballs or footballs shown in this example—and these encoded elements can be used to represent a theme in the encoded image. The different types of encoded elements can also be used to represent encoded data—in other words, data is conveyed or encoded by the use of a football as an encoded element (as opposed to the use of a basketball as an encoded element).

In some instances it could be useful to have another identifier 30 used in conjunction with an identifiable mark 22. Since in one implementation the identifiable mark can be Block A and can determine which decoding process to use, another identifier can be used as an additional feature of the anchor which helps distinguish the anchor from other similar anchor images. In this way, the same identifiable mark can be used with multiple encoding processes. FIG. 19 shows four encoded images. The two images on the right include another identifier 30 (a basketball, and a football). This other identifier 30 could indicate a completely different encoding process or it could simply, as in these cases, indicate what some of the encoded elements look like. This other identifier 30 could enable a brand to have several completely different looking encoding processes for different trademarks, categories, products and/or promotions while using the same identifiable mark.

For simplicity of the description, examples of encoded images 20 have been shown and described using one anchor/identifiable mark. It is understood that encoded images can be formed using one or more anchors/identifiable marks which may include one or more decoding triggers, if desired.

Embodiments of the present invention can act as consumer driven encoding, meaning the target user is the consumer. The encoded images can be designed to be captured by consumer driven technological devices, such as camera phones or other mobile image taking, and sending or uploading devices rather than bar code readers.

Some embodiments of the invention can facilitate electronic communications between two or more people using a mobile camera phone and one or more encoded images on or near a person with information contained in the encoded image that is specific to the person.

The encoded images 20 may serve as an icon or a personal logo and its encoded information might be displayed for viewing in many forms including, but not limited to, a printed form such as a personal identification card; as a visual marker stitched, embossed, molded, stamped, screen printed, woven, digitized or any other available process to create a visual mark on or contained in an article of clothing or apparel or as a wearable accessory or jewelry such as a necklace, earrings or a wrist accessory or similar. The encoded image could be in the form of a permanent or temporary tattoo or sticker or any other type or method of visual display that produces a visible mark, icon, logo or image that functions in a means so as to facilitate its capture (digital recording) of the image by a mobile camera phone or similar wireless image taking device.

One or more electronic messages or content in the form of digital files may be contained in a database and can be associated with the encoded alphanumeric value of the encoded image. In one example, the owner/user/licensee of an encoded image can update and change the message by connecting electronically to an internet domain and accessing a server-based database to change or update the message content in a text, image, audio, or video form or all of the above. Any conventional format can be used, such as but not limited to sms, ems, mms, email (text or html), attachment/content formats—mp3, mp4, wav, mpg, midi, 3gp, wmv, aac, vcf.

Examples of text messages a person may wish to communicate using an encoded image could be:

"Hi, my name is Madison"
"Visit me at madison@myspace.com"
"My telephone number is 555-555-5555"
"Meet me tomorrow at 10:00 am at Starbucks"

In one example, users can create unique encoded images such as personal icons or logos. A user can choose from a list of identifiable marks or create their own identifiable mark, encoded elements, and/or encoding process. The encoded image or icon may be personalized in its design by to create a truly unique symbol. The unique encoded image (icon or logo) may act as a symbol of identity to the user and may function as a personal logo. Examples of identifiable marks and/or encoded elements are company logos, astrological signs, initials, numbers, graphic designs, line drawings, animals, or any other image digitally recordable with a camera phone or other image taking device and readable by digital image analysis technology.

In one example, a method of wireless communication is disclosed herein utilizing a camera phone where a person takes a picture of a second person's encoded image 20, picture messages or emails it to a designated email address, phone number, or short code, uploads the image to a URL using a phone application, or sends via infrared or Bluetooth. The image can be routed to a designated network server. The image can be decoded using digital image analysis techniques and one or more of the operations described herein, with the resulting message being returned to the mobile camera phone handset having taken the picture. The decoded message may also be copied to a secondary designated URL for access via a personal computer or other internet enabled device. The decoded message can be sent to multiple email addresses, phone numbers, or other URLs for different users to access the decoded message and/or content.

In one example of the invention, users can create lists of friends and/or acquaintances to enable the establishment of a community of persons, buddy lists, members of a team, society, school, club or any other social, business or society group. New social networking groups can be created by creating games or promotions whereby users of mobile camera phones take a picture of encoded images to join or participate in a group activity.

Some embodiments of the invention can be used for people to be introduced to one another or offer a message to others in a social setting such as a sporting event or at a night club, social dance or other activity where people gather to meet.

The electronic message response contained in the encoded image may take the form of text, picture, sound, or video. The electronic message response can be returned wirelessly via the internet or other communication networks, including but not limited to wireless mobile phone carriers, such as Cingular, T-Mobile, Sprint or any other wireless carrier network. The electronic message response is returned to the mobile camera phone handset from a specific network server after the digital image or picture has been decoded.

If desired, a secured environment may be created where the access to the information (i.e., website or message) associated with the encoded image could be limited to known users (such as through the use of phone numbers that are approved by the owner of the encoded image). Password or pin restrictions could also be required to be sent or uploaded with the encoded image, or a message could be sent to the person submitting the captured image, asking for the password/pin to return the desired content. In one instance, only registered users can get the content. For example, with beer companies using encoded images to provide information to customers, the end-user could be asked if they are 21 years old before they are permitted to receive the beer company's messages or content.

The decoding may also occur on the handset with a connection to a server to retrieve the appropriate message response from a database. The electronic message response may include multiple responses with the additional links or other follow on actions available to the mobile handset owner as prompts or like offers. An offer may include opt in options for registration to a campaign, to community such as MySpace™, or to any other type of community or marketing campaign.

Some embodiments of the invention can be used to create unique encoded images for a user's pets or animals. For instance, the animal could wear an encoded image on a pet specific article of clothing such as a pet sweater or collar. The encoded image could contain a message set by the pet's owner and may provide a means for identification or a friendly greeting.

Embodiments of the invention can be embodied in a computer program product. It will be understood that a computer program product including features of the present invention may be created in a computer usable medium (such as a CD-ROM or other medium) having computer readable code embodied therein. The computer usable medium preferably contains a number of computer readable program code devices configured to cause a computer to affect the various functions required to carry out the invention, as herein described.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

It should be appreciated that in the foregoing description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A method of forming an image comprising,
   selecting a value, the value having one or more digits;
   based on at least one of the one or more digits, selecting an anchor image;
   selecting at least one element for positioning proximate to the anchor image;
   forming the image using the anchor image and the at least one element;
   based on at least one of the one or more digits, forming a characteristic of the at least one element; and wherein,
   at least one of the one or more digits corresponds to an angular location of the at least one element relative to the anchor image.

2. The method of claim 1, wherein forming a characteristic of the at least one element comprises positioning the at least one element relative to the anchor image at a location that corresponds to at least one of the one or more digits.

3. The method of claim 1, wherein forming a characteristic of the at least one element comprises coloring the at least one element with a color that corresponds to at least one of the one or more digits.

4. The method of claim 1, wherein forming a characteristic comprises sizing the at least one element with a size that corresponds to at least one of the one or more digits.

5. The method of claim 1, wherein forming a characteristic comprises orienting the at least one element at an orientation that corresponds to at least one of the one or more digits.

6. A method of encoding a value into an image, comprising:
   forming one or more blocks of digits, each of the one or more block of digits representing a portion of the value;
   selecting a primary image based on a content of at least one of the blocks of digits, the primary image being associated with an encoding technique;
   selecting at least one secondary image;
   constructing the image using the primary image and the secondary image; and
   positioning the at least one secondary image in a location relative to the primary image based on,
   the content of at least one of the blocks of digits, and
   the encoding technique.

7. The method of claim 6, wherein the operation of selecting a secondary image is based on the content of at least one of the blocks of digits.

8. The method of claim 6, wherein the primary image is a logo.

9. The method of claim 6, further comprising: mapping each of the one or more blocks of digits to hierarchical content.

10. The method of claim 9, wherein a first of the one or more blocks of digits are mapped to a first portion of the hierarchical content.

11. The method of claim 10, wherein a second of the one or more blocks of digits are mapped to a second portion of the hierarchical content.

12. A method of forming an image comprising,
   selecting a value, the value having one or more digits;
   based on at least one of the one or more digits, selecting an anchor image;
   selecting at least one element for positioning proximate to the anchor image;
   forming the image using the anchor image and the at least one element;
   based on at least one of the one or more digits, forming a characteristic of the at least one element by corresponding a size of the at least one element to at least one of the one or more digits.

13. The method of claim 12, wherein at least one of the one or more digits corresponds to an angular location of the at least one element relative to the anchor image.

14. The method of claim 12, wherein forming a characteristic of the at least one element comprises positioning the at least one element relative to the anchor image at a location that corresponds to at least one of the one or more digits.

15. The method of claim 12, wherein forming a characteristic of the at least one element comprises coloring the at least one element with a color that corresponds to at least one of the one or more digits.

16. The method of claim 1, wherein forming a characteristic comprises orienting the at least one element at an orientation that corresponds to at least one of the one or more digits.

* * * * *